(12) United States Patent
Morioka et al.

(10) Patent No.: US 10,652,857 B2
(45) Date of Patent: *May 12, 2020

(54) TELECOMMUNICATIONS APPARATUS AND METHODS

(71) Applicant: CONVIDA WIRELESS, LLC, Wilmington, DE (US)

(72) Inventors: Yuichi Morioka, Reading (GB); Steven John Barrett, Thatcham (GB); Phil Young, Medstead (GB); Martin Beale, Kingsdown (GB)

(73) Assignee: CONVIDA WIRELESS, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/258,669

(22) Filed: Jan. 28, 2019

(65) Prior Publication Data

US 2019/0159173 A1    May 23, 2019

Related U.S. Application Data

(63) Continuation of application No. 15/434,902, filed on Feb. 16, 2017, now Pat. No. 10,200,972, which is a
(Continued)

(30) Foreign Application Priority Data

Aug. 19, 2011   (GB) .................................. 1114335.1

(51) Int. Cl.
*H04W 72/00*   (2009.01)
*H04W 4/06*    (2009.01)
(Continued)

(52) U.S. Cl.
CPC ......... *H04W 72/005* (2013.01); *H04L 1/1861* (2013.01); *H04L 1/1887* (2013.01);
(Continued)

(58) Field of Classification Search
CPC .... H04W 72/005; H04W 4/06; H04L 1/1861; H04L 1/1887; H04L 5/0055; H04L 5/0092
See application file for complete search history.

(56) References Cited

U.S. PATENT DOCUMENTS 9,549,398 B2 * 1/2017 Darwood ............ H04W 72/042
2003/0227934 A1   12/2003 White et al.
(Continued)

FOREIGN PATENT DOCUMENTS

CN     1640070 A    7/2005
GB     2310972 A    9/1997
(Continued)

OTHER PUBLICATIONS

"Digital cellular telecommunication system (phase 2+); Universal Mobile Telecommunications System (UMTS);", 3GPP LTE ETSI TS 122 368 V10.5.0, Jul. 2011, pp. 1-17 with cover page.
(Continued)

*Primary Examiner* — Yemane Mesfin
*Assistant Examiner* — Henry Baron
(74) *Attorney, Agent, or Firm* — Xsensus LLP

(57) ABSTRACT

A method of communicating data between a base station and a plurality of terminal devices in a wireless telecommunications system. The method comprises transmitting data from the base station to the plurality of terminal devices in a multicast transmission and transmitting response signals from the terminal devices to the base station to indicate whether the respective terminal devices have successfully received the multicast transmission. The use of a multicast transmission provides an efficient mechanism for communicating the same data to a plurality of terminal device, for example as might be desired in a machine-type communication network. In combination with this, the use of indi-
(Continued)

vidual response signals, such as ACK/NACK signalling, from the terminal devices allows the base station, or other entity, such as a machine-type communications server, to track which terminal devices have indicated successful receipt of the multicast transmission, and to instigate an appropriate re-transmission protocol accordingly.

18 Claims, 22 Drawing Sheets

Related U.S. Application Data continuation of application No. 14/179,254, filed on Feb. 12, 2014, now Pat. No. 9,585,122, which is a continuation of application No. PCT/GB2012/051949, filed on Aug. 10, 2012.

(51) Int. Cl.
    *H04L 1/18*     (2006.01)
    *H04L 5/00*     (2006.01)

(52) U.S. Cl.
    CPC .......... *H04L 5/0055* (2013.01); *H04L 5/0092* (2013.01); *H04W 4/06* (2013.01)

(56) References Cited

U.S. PATENT DOCUMENTS

| | | |
|---|---|---|
| 2006/0200585 A1 | 9/2006 | Weigert |
| 2007/0071025 A1 | 3/2007 | Bergstrom et al. |
| 2007/0253370 A1 | 11/2007 | Khan et al. |
| 2009/0323577 A1 | 12/2009 | Agrawal et al. |
| 2010/0074182 A1 | 3/2010 | Shao |
| 2010/0080308 A1 | 4/2010 | Yin et al. |
| 2010/0325504 A1 | 12/2010 | Lee et al. |
| 2011/0044223 A1 | 2/2011 | Kim et al. |
| 2011/0085457 A1 | 4/2011 | Chen et al. |
| 2011/0211518 A1 | 9/2011 | Gupta et al. |
| 2012/0092982 A1 | 4/2012 | Nakao et al. |
| 2013/0051326 A1 | 2/2013 | Jeyatharan et al. |

FOREIGN PATENT DOCUMENTS

| | | |
|---|---|---|
| GB | 2487757 A | 8/2012 |
| GB | 2487780 A | 8/2012 |
| GB | 2487782 A | 8/2012 |
| GB | 2487906 A | 8/2012 |
| GB | 2487907 A | 8/2012 |
| GB | 2487908 A | 8/2012 |
| GB | 2487909 A | 8/2012 |
| GB | 2488513 A | 9/2012 |
| JP | 2008-530896 A | 8/2008 |
| JP | 2009-247026 A | 10/2009 |
| JP | 2010-515332 A | 5/2010 |
| WO | 2006/088301 A1 | 8/2006 |
| WO | 2007/051193 A2 | 5/2007 |
| WO | 2008/085000 A1 | 7/2008 |
| WO | 2009/133629 A1 | 11/2009 |
| WO | 2010/022070 A1 | 2/2010 |
| WO | 2011/100479 A1 | 8/2011 |
| WO | 2011/135800 A1 | 11/2011 |

OTHER PUBLICATIONS

"LTE; Evolved Universal Terrestrial Radio Access (E-UTRA); Medium Access Control (MAC) protocol specification", 3GPP LTE ETSI TS 136 321 V10.2.0, Jun. 2011, pp. 1-55 with cover page.
"LTE; Evolved Universal Terrestrial Radio Access (E-UTRA);", 3GPP L TE ETSI TS 136 213 V10.2.0, Jun. 2011, pp. 1-121 with cover page.
Combined Chinese Office Action and Search Report dated Mar. 28, 2016 in Patent Application No. 201280040517.2 (with English Translation of Categories of Cited Documents).
European Office Action dated Aug. 30, 2017 in Patent Application No. 12 754 075.5.
International Search Report dated Nov. 13, 2012 for PCT/GB2012/051949 filed on Aug. 10, 2012 in English.
Office Action dated Apr. 5, 2016 in Japanese Patent Application No. 2014-526544.
Search Report issued in United Kingdom Patent Application No. 1114335.1.

\* cited by examiner

TELECOMMUNICATIONS APPARATUS AND METHODS

CROSS-REFERENCE TO RELATED APPLICATIONS

This application is a continuation of U.S. patent application Ser. No. 15/434,902, filed Feb. 16, 2017, which is a continuation of U.S. patent application Ser. No. 14/179,254, filed Feb. 12, 2014, which is a continuation of International Application No. PCT/GB2012/051949, filed Aug. 10, 2012 and is based upon and claims the benefit of priority from prior United Kingdom Application No. 1114335.1, filed Aug. 19, 2011, the entire contents of all of winch are incorporated herein by reference.

BACKGROUND OF THE INVENTION

The present invention relates to methods, systems and apparatus for transmitting data in mobile telecommunication systems, and in particular transmitting data in a multicast transmission.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server data relating to the customers consumption of a utility such as gas, water, electricity and so on. Further information on characteristics of MTC-type devices can be found, for example, in the corresponding standards, such as ETSI TS 122 368 V10.530 (2011-07)/3GPP TS 22.368 version 10.5.0 Release 10) [1].

Multicast data transmission is an established technique for efficiently communicating content, for example, streaming media, to multiple recipients in an efficient manner. It can be foreseen that multicast data transmissions may in future be used more and more, for example, to transmit operational data, e.g. software updates, to a plurality of MTC connected to a server through a wireless network.

Furthermore, whilst it can be convenient for a terminal such as an MTC type terminal to take advantage of the wide coverage area provided by a third or fourth generation mobile telecommunication network there are at present disadvantages. Unlike a conventional third or fourth generation terminal device such as a smartphone, an MTC-type terminal is preferably relatively simple and inexpensive. The type of functions performed by the MTC-type terminal (e.g. collecting and reporting back data) do not require particularly complex processing to perform. However, third and fourth generation mobile telecommunication networks typically employ advanced data modulation techniques on the radio interface which can require more complex and expensive radio transceivers to implement. It is usually justified to include such complex transceivers in a smartphone as a smartphone will typically require a powerful processor to perform typical smartphone type functions. However, as indicated above, there is now a desire to use relatively inexpensive and less complex devices to communicate using LTE type networks. In parallel with this drive to provide network accessibility to devices having different operational functionality, e.g. reduced bandwidth operation, is a desire to optimise the use of the available bandwidth for communicating with such devices, for example using multicast techniques.

SUMMARY OF THE INVENTION

According to a first as aspect of the invention there is provided a method of communicating data in a wireless telecommunications system, the method comprising: transmitting data from a base station to a plurality of terminal devices in a multicast transmission; and transmitting response signals from respective ones of the terminal devices to the base station in response to the multicast transmission to indicate whether the respective terminal devices have successfully received the multicast transmission.

In accordance with some embodiments the method further comprises conveying to respective ones of the terminal devices an indication of an uplink transmission resource to be used for their response signal, for example, an indication of a time, code and/or frequency resource.

In accordance with some embodiments the indication of an uplink transmission resource is conveyed during a set-up procedure performed when the respective terminal devices connect to the wireless telecommunications system. The set-up procedure may comprise a Radio Resource Connection request.

In accordance with some embodiments the indication of an uplink transmission resource is conveyed in association with the multicast transmission.

In accordance with some embodiments the indication of an uplink transmission resource is conveyed by explicit signalling and in some embodiments the indication is conveyed by implicit signalling, for example, within a radio network identifier.

In accordance with some embodiments the indication of an uplink transmission resource comprises at least one of an indication of a transmission resource within an uplink sub-frame, an indication of an uplink sub-frame, and an indication of an uplink carrier.

In accordance with some embodiments the response signals are transmitted on a Physical Uplink Control Channel, PUCCH.

In accordance with some embodiments the response signals are transmitted in an uplink sub-frame of the wireless telecommunications system occurring at a time derived from the time of a downlink sub-frame containing the multicast transmission.

In accordance with some embodiments different ones of the terminal devices transmit their response signals in different uplink sub-frames and/or carriers of the wireless telecommunications system.

In accordance with some embodiments the method further comprises determining from the response signals received at the base station whether any terminal device has not received the multicast transmission, and if so, re-transmitting the data from the base station.

In accordance with some embodiments the response signals from different ones of the terminal devices are transmitted using different uplink transmission resources.

In accordance with some embodiments the wireless telecommunications system may implement a virtual carrier such that the system operates in downlink over a first frequency bandwidth and in uplink over a second frequency bandwidth, and wherein the multicast transmission is made using downlink transmission resources on frequencies selected from within a third frequency bandwidth which is smaller than and within the first frequency bandwidth; and wherein the response signals from the terminal devices are transmitted using uplink transmission resources on frequencies selected from within a fourth frequency bandwidth which is smaller than and within the second frequency bandwidth. Furthermore, the first and second frequency bandwidths may be the same width and/or the third and fourth frequency bandwidths may be the same width.

According to another aspect of the invention there is provided a wireless telecommunications system comprising a base station and a plurality of terminal devices, wherein the base station is configured to transmit data to a plurality of terminal devices in a multicast transmission, and wherein the terminal devices are configured to transmit response signals to the base station in response to the multicast transmission to indicate whether they have successfully received the multicast transmission.

According to another aspect of the invention there is provided a method of operating a base station for communicating data in a wireless telecommunications system, the method comprising: transmitting data to a plurality of terminal devices in a multicast transmission; and receiving response signals from respective ones of the terminal devices transmitted in response to the multicast transmission to indicate whether the respective terminal devices have successfully received the multicast transmission.

According to another aspect of the invention there is provided a base station for communicating data with a plurality of terminal devices in a wireless telecommunications system, wherein the base station is configured to transmit data to the plurality of terminal devices in a multicast transmission, and wherein the base station is further configured to receive response signals transmitted by respective ones of the terminal devices in response to the multicast transmission to indicate whether they have successfully received the multicast transmission.

According to another aspect of the invention there is provided a According to another aspect of the invention there is provided a method of operating a terminal device for the communication data in a wireless telecommunications system, the method comprising: receiving data transmitted by a base station to a plurality of terminal devices in a multicast transmission; and transmitting a response signal to the base station in response to the multicast transmission to indicate whether the terminal device successfully received the multicast transmission.

According to another aspect of the invention there is provided a terminal device for receiving data in a wireless telecommunications system, wherein the terminal device is configured to receive data transmitted by a base station to a plurality of terminal devices in a multicast transmission, and wherein the terminal device is further configured to transmit a response signal to the base station in response to the multicast transmission to indicate whether the terminal device successfully received the multicast transmission.

It will be appreciated that features and aspects of the invention described above in relation to the first and other aspects of the invention are equally applicable and may be combined with embodiments of the invention according to the different aspects of the invention as appropriate, and not just in the specific combinations described above.

BRIEF DESCRIPTION OF DRAWINGS

Embodiments of the present invention will now be described by way of example only with reference to the accompanying drawings where like parts are provided with corresponding reference numerals and in which.

DESCRIPTION OF EXAMPLE EMBODIMENTS

Embodiments of the invention may in particular be employed within the context of what might be termed "virtual carriers" operating within a bandwidth of a "host carriers". The concepts of virtual carriers are described in co-pending UK patent applications numbered GB 1101970.0 [2], GB 1101981.7 [3], GB 1101966.8 [4], GB 1101983.3 [5], GB 1101853.8 [6], GB 1101982.5 [7], GB 1101980.9 [8] and GB 1101972.6 [9], the contents of which are incorporated herein by reference. The reader is referred to these co-pending applications for more details, but for ease of reference an overview of the concept of virtual carriers is also provided here.

Conventional Network

Figure 1:
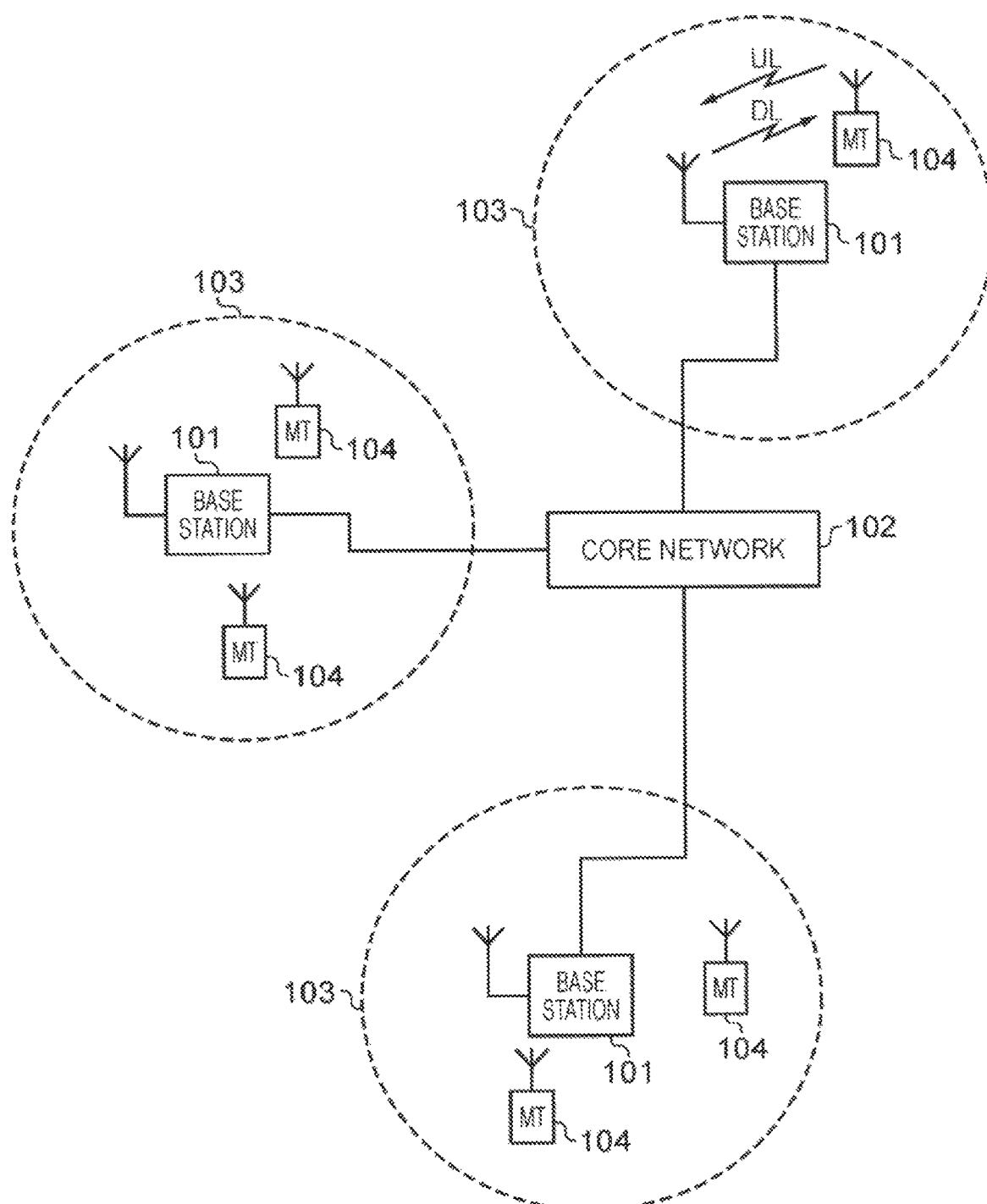
FIG. 1 provides a schematic diagram illustrating an example of a conventional mobile telecommunication network.

FIG. 1 provides a schematic diagram illustrating some basic functionality of a conventional mobile telecommunications network.

The network includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 mutes data to and from the terminal devices 104 via the respective base stations 101 and provides functions such as authentication, mobility management, charging and so on.

Figure 2:
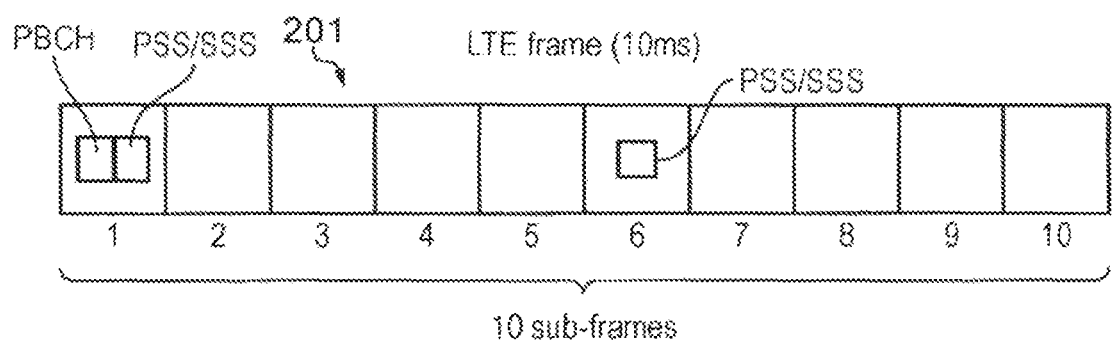
FIG. 2 provides a schematic diagram illustrating a conventional LTE radio frame.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA). FIG. 2 shows a schematic diagram illustrating an OFDM based LTE downlink radio frame 201. The LTE downlink radio frame is transmitted from an LTE base station (known as an enhanced Node B) and lasts 10 ms. The downlink radio frame comprises ten sub-frames, each sub-frame lasting 1 ms. A primary synchronisation signal (PSS) and a secondary synchronisation signal (SSS) are transmitted in the first and sixth sub-frames of the LTE frame. A primary broadcast channel (PBCH) is transmitted in the first sub-frame of the LTE frame. The PSS, SSS and PBCH are discussed in more detail below.

Figure 3:
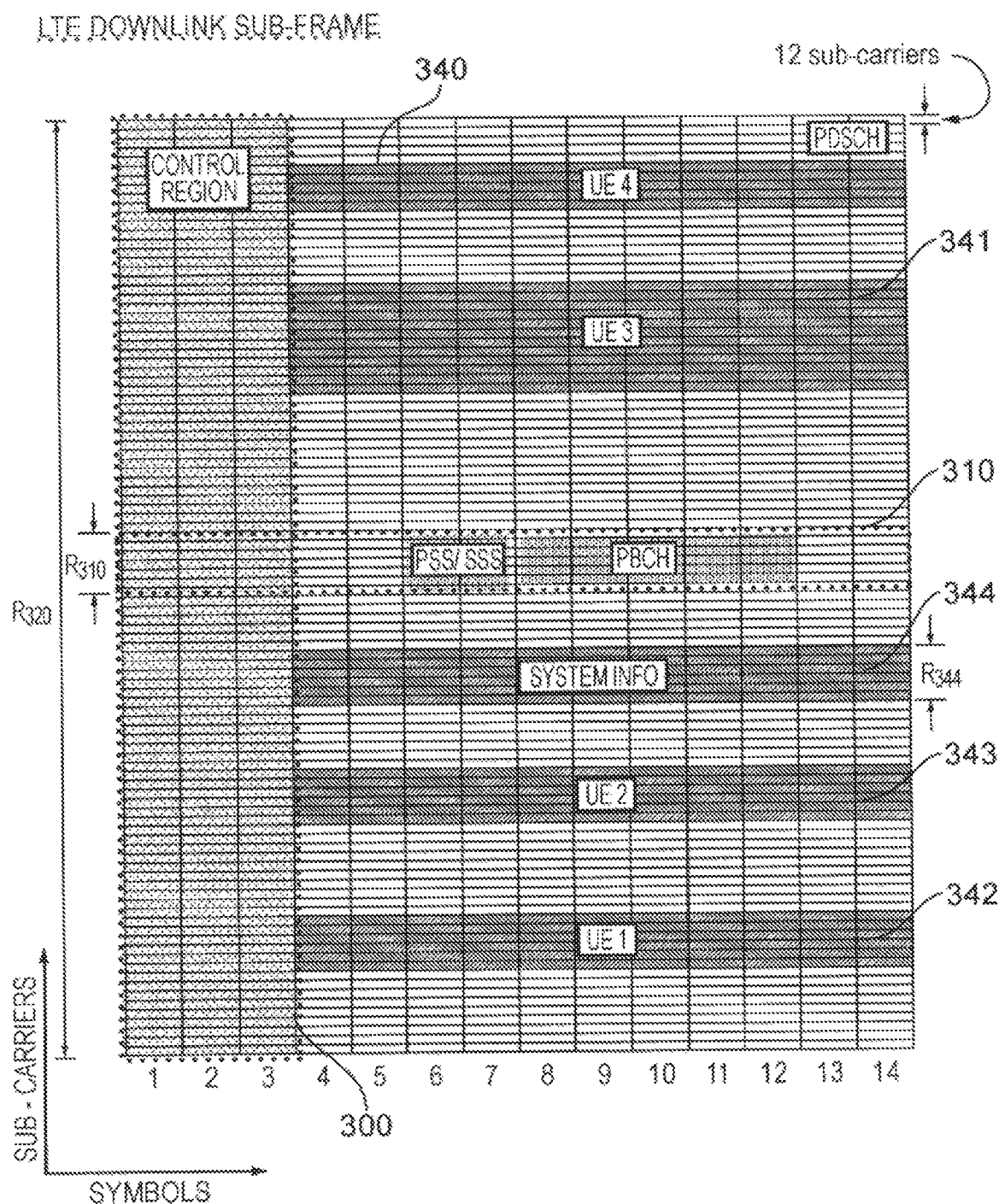
FIG. 3 provides a schematic diagram illustrating an example of a conventional LTE downlink radio sub-frame.

FIG. 3 is a schematic diagram of a grid which illustrates the structure of an example conventional downlink LTE sub-frame. The sub-frame comprises a predetermined number of symbols which are transmitted over a 1 ms period. Each symbol comprises a predetermined number of orthogonal sub-carriers distributed across the bandwidth of the downlink radio carrier.

The example sub-frame shown in FIG. 3 comprises 14 symbols and 1200 sub-carriers spread across a 20 MHz bandwidth. The smallest allocation of user data for transmission in LTE is a resource block comprising twelve sub-carriers transmitted over one slot (0.5 sub-frame). For clarity, in FIG. 3, each individual resource element is not shown, instead each individual box in the sub-frame grid corresponds to twelve sub-carriers transmitted on one symbol.

FIG. 3 shows in hatching resource allocations for four LTE terminals 340, 341, 342, 343. For example, the resource allocation 342 for a first LTE terminal (UE 1) extends over five blocks of twelve sub-carriers (i.e. 60 sub-carriers), the resource allocation 343 for a second LTE terminal (UE2) extends over six blocks of twelve sub-carriers and so on.

Control channel data is transmitted in a control region 300 (indicated by dotted-shading in FIG. 3) of the sub-frame comprising the first n symbols of the sub-frame where n can vary between one and three symbols for channel bandwidths of 3 MHz or greater and where n can vary between two and four symbols for channel bandwidths of 1.4 MHz. For the sake of providing a concrete example, the following description relates to host carriers with a channel bandwidth of 3 MHz or greater so the maximum value of n will be 3. The data transmitted in the control region 300 includes data transmitted on the physical downlink control channel (PDCCH), the physical control format indicator channel (PCFICH) and the physical HARQ indicator channel (PHICH).

PDCCH contains control data indicating which sub-carriers on which symbols of the sub-frame have been allocated to specific LTE terminals. Thus, the PDCCH data transmitted in the control region 300 of the sub-frame shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow an LTE terminal device to achieve frame synchronisation and determine the cell identity of the enhanced Node B transmitting the downlink signal. The PBCH carries information about the cell, comprising a master information block (MIB) that includes parameters that LTE terminals use to properly access the cell. Data transmitted to individual LTE terminals on the physical downlink shared channel (PDSCH) can be transmitted in other resource elements of the sub-frame. Further explanation of these channels is provided below.

FIG. 3 also shows a region of PDSCH containing system information and extending over a bandwidth of $R_{344}$. A conventional LTE frame will also include reference signals which are discussed further below but not shown in FIG. 3 in the interests of clarity.

The number of sub-carriers in an LTE channel can vary depending on the configuration of the transmission network. Typically this variation is from 72 sub carriers contained within a 1.4 MHz channel bandwidth to 1200 sub-carriers contained within a 20 MHz channel bandwidth (as schematically shown in FIG. 3). As is known in the art, data transmitted on the PDCCH, PCFICH and PHICH is typically distributed on the sub-carriers across the entire bandwidth of the sub-frame to provide for frequency diversity. Therefore a conventional LTE terminal must be able to receive the entire channel bandwidth in order to receive and decode the control region.

Figure 4:
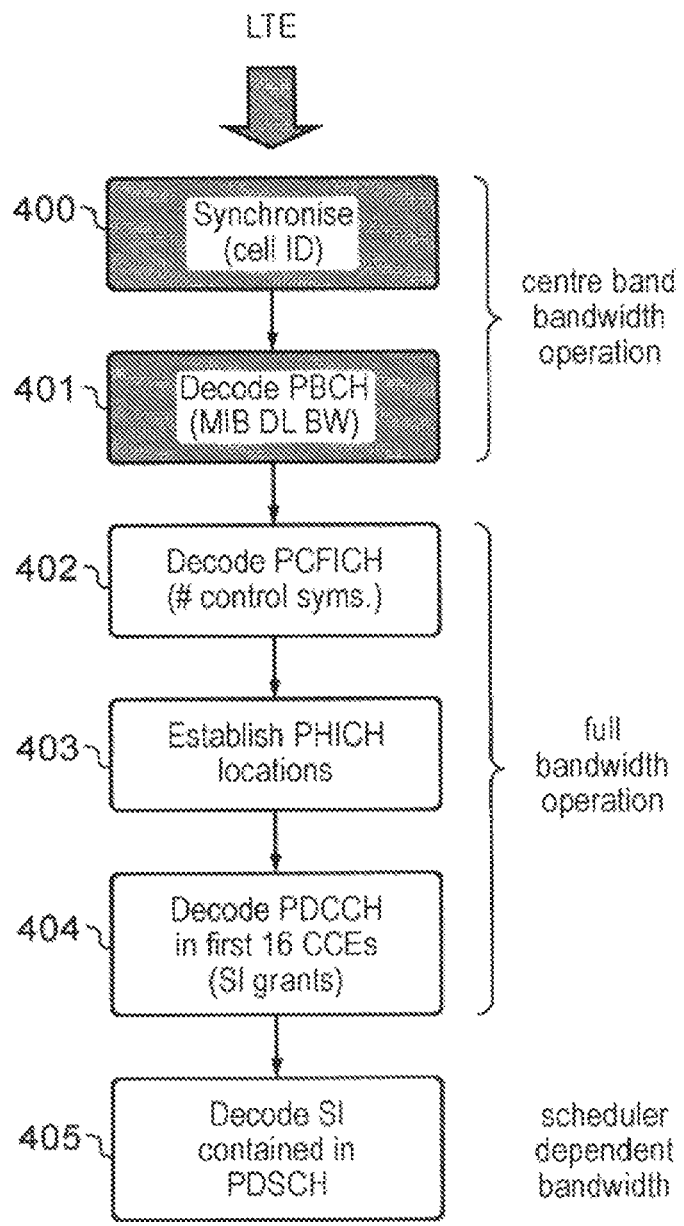
FIG. 4 provides a schematic diagram illustrating a conventional LTE "camp-on" procedure.

FIG. 4 illustrates an LTE "camp-on" process, that is, the process followed by a terminal so that it can decode downlink transmissions which are sent by a base station via a downlink channel. Using this process, the terminal can identify the parts of the transmissions that include system information for the cell and thus decode configuration information for the cell.

As can be seen in FIG. 4, in a conventional LTE camp-on procedure, the terminal first synchronizes with the base station (step 400) using the PSS and SSS in the centre band and then decodes the PBCH (step 401). Once the terminal has performed steps 400 and 401, it is synchronized with the base station.

For each sub-frame, the terminal then decodes the PCFICH which is distributed across the entire bandwidth of carrier 320 (step 402). As discussed above, an LTE downlink carrier can be up to 20 MHz wide (1200 sub-carriers) and an LTE terminal therefore has to have the capability to receive and decode transmissions on a 20 MHz bandwidth in order to decode the PCFICH. At the PCFICH decoding stage, with a 20 MHz carrier band, the terminal operates at a much larger bandwidth (bandwidth of $R_{320}$) than during steps 400 and 401 (bandwidth of $R_{330}$) relating to synchronization and PBCH decoding.

The terminal then ascertains the PHICH locations (step 403) and decodes the PDCCH (step 404), in particular for identifying system information transmissions and for identifying its personal allocation grants. The allocation grants are used by the terminal to locate system information and to locate its data in the PDSCH. Both system information and personal allocations are transmitted on PDSCH and scheduled within the carrier band 320. Steps 403 and 404 also require the terminal to operate on the entire bandwidth R320 of the carrier band.

At steps 402 to 404, the terminal decodes information contained in the control region 300 of a sub-frame. As explained above, in LTE, the three control channels mentioned above (PCFICH, PHICH and PDCCH) can be found across the control region 300 of the carrier where the control region extends over the range $R_{320}$ and occupies the first one, two or three OFDM symbols of each sub-frame as discussed above. In a sub-frame, typically the control channels do not use all the resource elements within the control region 300, but they are scattered across the entire region, such that a LTE terminal has to be able to simultaneously receive the entire control region 300 for decoding each of the three control channels.

The terminal can then decode the PDSCH (step 405) which contains system information or data transmitted for this terminal.

As explained above, in an LTE sub-frame the PDSCH generally occupies groups of resource elements which are neither in the control region nor in the resource elements occupied by PSS, SSS or PBCH. The data in the blocks of resource elements 340, 341, 342, 343 allocated to the different mobile communication terminals (UEs) shown in FIG. 3 have a smaller bandwidth than the bandwidth of the entire carrier, although to decode these blocks a terminal first receives the PDCCH spread across the frequency range $R_{320}$ to determine if the PDCCH indicates that a PDSCH resource is allocated to the UE and should be decoded. Once a UE has received the entire sub-frame, it can then decode the PDSCH in the relevant frequency range (if any) indicated by the PDCCH. So for example, UE 1 discussed above decodes the whole control region 300 and then the data in the resource block 342.

Virtual Downlink Carrier

Certain classes of devices, such as MTC devices (e.g. semi-autonomous or autonomous wireless communication devices such as smart meters as discussed above), support communication applications that are characterised by the transmission of small amounts of data at relatively infrequent intervals and can thus be considerably less complex than conventional LTE terminals. In many scenarios, providing low capability terminals such as those with a conventional high-performance LTE receiver unit capable of receiving and processing data from an LTE downlink frame across the full carrier bandwidth can be overly complex for a device which only needs to communicate small amounts of data. This may therefore limit the practicality of a widespread deployment of low capability MTC type devices in an LTE network. It is preferable instead to provide low capability terminals such as MTC devices with a simpler receiver unit which is more proportionate with the amount of data likely to be transmitted to the terminal. As set out below, in accordance with examples of the present invention a "virtual carrier" is provided within the transmission resources of a conventional OFDM type downlink carrier (i.e. a "host carrier"). Unlike data transmitted on a conventional OFDM type downlink carrier, data transmitted on the virtual carrier can be received and decoded without needing to process the full bandwidth of the downlink host OFDM carrier. Accordingly, data transmitted on the virtual carrier can be received and decoded using a reduced complexity receiver unit.

Figure 5:
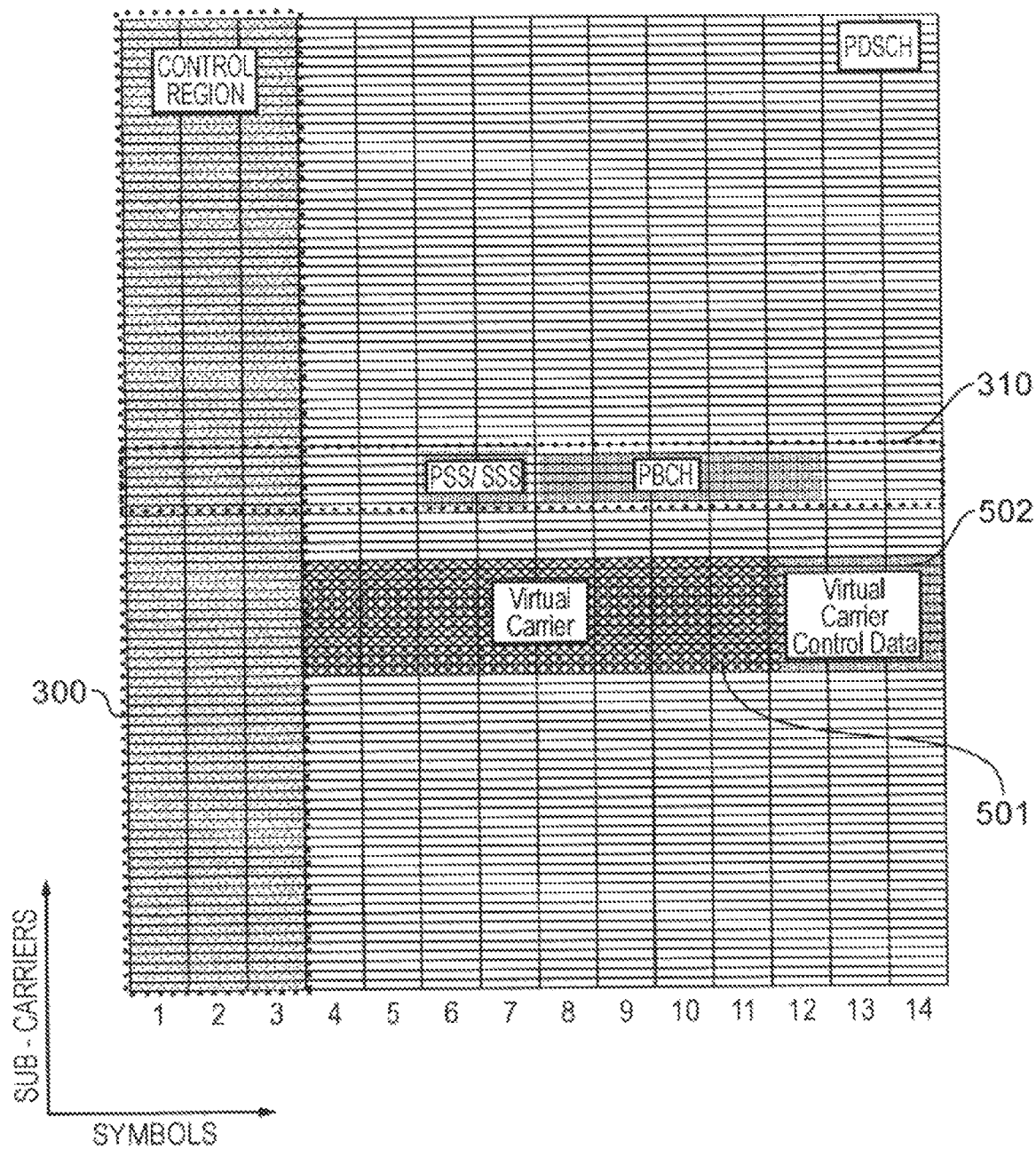
FIG. 5 provides a schematic diagram illustrating an LTE downlink radio sub-frame in which a virtual carrier has been inserted in accordance with an embodiment of the invention.

FIG. 5 provides a schematic diagram illustrating an LTE downlink sub-frame which includes a virtual carrier inserted in a host carrier in accordance with an example of the present invention.

In keeping with a conventional LTE downlink sub-frame, the first n symbols (n is three in FIG. 5) form the control region 300 which is reserved for the transmission of downlink control data such as data transmitted on the PDCCH. However, as can be seen from FIG. 5, outside of the control region 300 the LTE downlink sub-frame includes a group of resource elements positioned in this example below the central band 310 which form a virtual carrier 501. As explained further below, the virtual carrier 501 is adapted so that data transmitted on the virtual carrier 501 can be treated as logically distinct from data transmitted in the remaining parts of the host carrier and can be decoded without decoding all the control data from the control region 300. Although FIG. 5 shows the virtual carrier occupying frequency resources below the centre band, in general the virtual carrier can occupy other frequency resources, for example, above the centre band or including the centre band. If the virtual carrier is configured to overlap any resources used by the PSS. SSS or PBCH of the host carrier, or any other signal transmitted by the host carrier that a terminal device operating on the host carrier would require for correct operation and expect to find in a known predetermined location, the signals on the virtual carrier can be arranged such that these aspects of the host carrier signal are maintained.

As can be seen from FIG. 5, data transmitted on the virtual carrier 501 is transmitted across a limited bandwidth. This might be any suitable bandwidth smaller than that of the host carrier. In the example shown in FIG. 5 the virtual carrier is transmitted across a bandwidth comprising 12 blocks of 12 sub-carriers (i.e. 144 sub-carriers), which is equivalent to a 2.16 MHz transmission bandwidth. Accordingly, a terminal using the virtual carrier need only be equipped with a receiver capable of receiving and processing data transmitted over a bandwidth of 2.16 MHz. This enables low capability terminals (for example MTC type terminals) to be provided with simplified receiver units yet still be able to operate within an OFDM type communication network which, as explained above, conventionally requires terminals to be equipped with receivers capable of receiving and processing an OFDM signal across the entire bandwidth of the signal.

As explained above, in OFDM-based mobile communication systems such as LTE, downlink data is dynamically assigned to be transmitted on different sub-carriers on a sub-frame by sub-frame basis. Accordingly, in every sub-frame the network signals which sub-carriers on which symbols contain data relevant to which terminals (i.e. downlink grant signalling).

As can be seen from FIG. 3, in a conventional downlink LTE sub-frame this information is transmitted on the PDCCH during the first symbol or symbols of the sub-frame. However, as previously explained, the information transmitted in the PDCCH is spread across the entire bandwidth of the sub-frame and therefore cannot be received by a mobile communication terminal with a simplified receiver unit capable only of receiving the reduced bandwidth virtual carrier.

Accordingly, as can be seen in FIG. 5, the final symbols of the virtual carrier can be reserved as a control region 502 for the virtual carrier for the transmission of control data indicating which resource elements of the virtual carrier 501 have been allocated to user equipment (UEs) using the virtual carrier. In some examples the number of symbols comprising the virtual carrier control region 502 might be fixed, for example three symbols. In other examples the virtual carrier control region 502 can vary in size, for example between one and three symbols, as with the control region 300.

The virtual carrier control region can be located at any suitable position, for example in the first few symbols of the virtual carrier. In the example of FIG. 5 this could mean positioning the virtual carrier control region on the fourth, fifth and sixth symbols. However, fixing the position of the virtual carrier control region in the final symbols of the sub-frame can be useful because the position of the virtual carrier control region will not vary in dependence on the number of symbols of the host carrier control region 300. This can help simplify the processing undertaken by mobile communication terminals receiving data on the virtual carrier because there is no need for terminals to determine a position of the virtual carrier control region every sub-frame if it is known that it will always be positioned in the final n symbols of the sub-frame.

In a further embodiment, the virtual carrier control symbols may reference virtual carrier PDSCH transmissions in a separate sub-frame.

In some examples the virtual carrier may be located within the centre band 310 of the downlink sub-frame. This can help reduce the impact on host carrier PDSCH resources caused by the introduction of the virtual carrier within the host carrier bandwidth since the resources occupied by the PSS/SSS and PBCH would be contained within the virtual carrier region and not the remaining host carrier PDSCH region. Therefore, depending on for example the expected virtual carrier throughput, the location of a virtual carrier can be appropriately chosen to either exist inside or outside the centre band according to whether the host or virtual carrier is chosen to bear the overhead of the PSS, SSS and PBCH.

Virtual Carrier "Camp-On" Process

As explained above, before a conventional LTE terminal can begin transmitting and receiving data in a cell, it first camps on to the cell. An adapted camp-on process can be provided for terminals using the virtual carrier.

Figure 6:
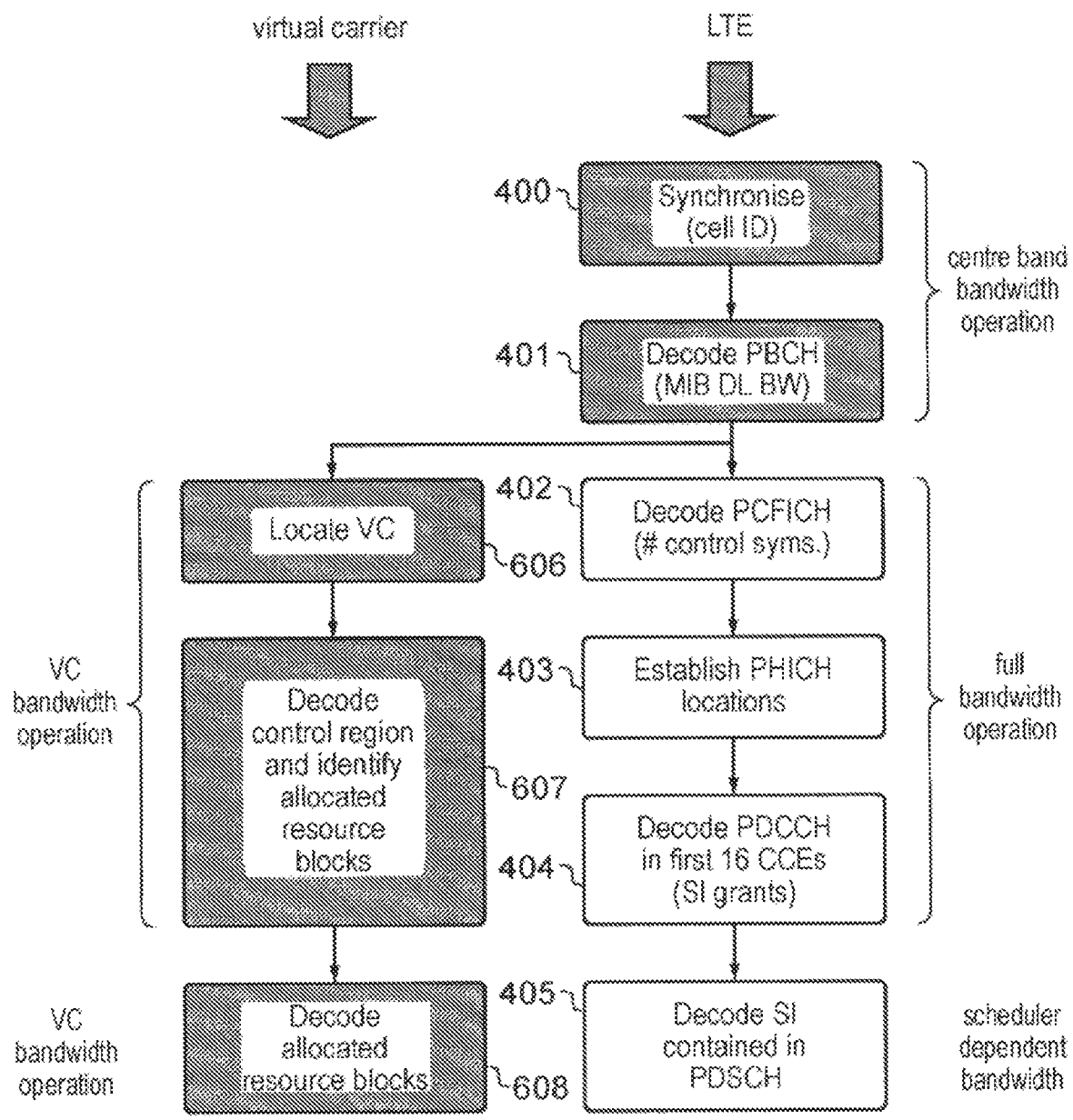
FIG. 6 provides a schematic diagram illustrating an adapted LTE "camp-on" procedure for camping on to a virtual carrier.

FIG. 6 shows a flow diagram schematically illustrating a camp-on process according to an example of the present invention. There are two branches shown in FIG. 6. Different steps of the process associated with a UE intending to use the virtual carrier are shown under the general heading "virtual carrier". The steps shown under the general heading "legacy LTE" are associated with a UE intending to use the host carrier, and these steps correspond to the steps of FIG. 4. In this example, the first two steps 400, 401 of the camp-on procedure are common to both the virtual carrier and host (legacy LTE) carrier.

The virtual carrier camp-on process is explained with reference to the example sub-frame shown in FIG. 5 in which a virtual carrier with a bandwidth of 144 sub-carriers is inserted within the operating bandwidth of a host carrier with a bandwidth corresponding to 1200 sub-carriers. As discussed above, a terminal having a receiver unit with an operational bandwidth of less than that of the host carrier cannot fully decode data in the control region of sub-frames of the host carrier. However, a receiver unit of a terminal having an operational bandwidth of only twelve blocks of twelve sub-carriers (i.e. 2.16 MHz) can receive control and user data transmitted on this example virtual carrier 502.

As noted above, in the example of FIG. 6, the first steps 400 and 401 for a virtual carrier terminal are the same as the conventional camp-on process shown in FIG. 4, although a virtual carrier terminal may extract additional information from the MIB as described below. Both types of terminals (i.e. virtual carrier terminals and host/legacy carrier terminals) can use the PSS/SSS and PBCH to synchronize with the base station using the information carried on the 72 sub-carrier centre band within the host carrier. However, where the conventional LTE terminals then continue with the process by performing the PCFICH decoding step 402, which requires a receiver unit capable of receiving and decoding the host carrier control region 300, a terminal camping on to the cell to receive data on the virtual carrier (which may be referred to as a "virtual carrier terminal") performs steps 606 and 607 instead.

In a further embodiment of the present invention a separate synchronisation and PBCH functionality can be provided for the virtual carrier device as opposed to re-using the same conventional initial camp-on processes of steps 400 and 401 of the host carrier device.

Figure 7:
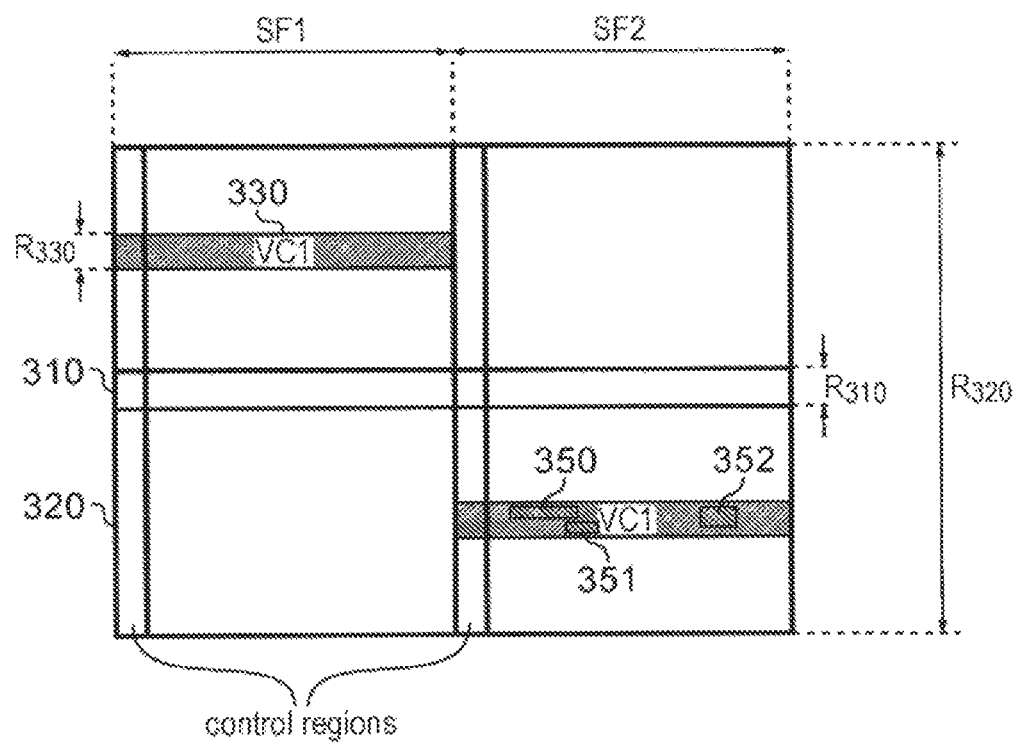
FIG. 7 provides a schematic diagram illustrating LTE downlink radio sub-frames in accordance with an embodiment of the present invention.

At step 606, the virtual carrier terminal locates a virtual carrier, if any is provided within the host carrier, using a virtual carrier-specific step. Various examples of how this step may be performed are discussed further below. Once the virtual carrier terminal has located a virtual carrier, it can access information within the virtual carrier. For example, if the virtual carrier mirrors the conventional LTE resource allocation method, the virtual carrier terminal may proceed to decode control portions within the virtual carrier, which can, for example, indicate which resource elements within the virtual carrier have been allocated for a specific virtual carrier terminal or for system information. For example, FIG. 7 shows the blocks of resource elements 350 to 352 within virtual carrier 330 that have been allocated for the sub-frame SF2. However, there is no requirement for the virtual carrier terminal to follow or mirror the conventional LTE process (e.g. steps 402-404) and these steps may for example be implemented very differently for a virtual carrier camp-on process.

Regardless of the virtual carrier terminal following a LTE-like step or a different type of step when performing step 607, the virtual carrier terminal can then decode the allocated resource elements at step 608 and thereby receive data transmitted by the base station broadcasting the virtual carrier. The data decoded in step 608 may include, for example, the remainder of the system information containing details of the network configuration.

Even though the virtual carrier terminal does not have the bandwidth capabilities to decode and receive downlink data if it was transmitted in the host carrier using conventional LTE, it can still access a virtual carrier within the host carrier having a limited bandwidth whilst re-using the initial LTE steps. Step 608 may also be implemented in a LTE-like manner or in a different manner. For example, multiple virtual carrier terminals may share a virtual carrier and have grants allocated to manage the virtual carrier sharing as shown in SF2 in FIG. 7, or, in another example, a virtual carrier terminal may have the entire virtual carrier allocated for its own downlink transmissions, or the virtual carrier may be entirely allocated to a virtual carrier terminal for a certain number of sub-frame only, etc.

There is thus a large degree of flexibility provided for the virtual carrier camp-on process. There is, for example, the ability to adjust a balance between re-using or mirroring conventional LTE steps or processes, thereby reducing the terminal complexity and the need to implement new elements, and adding new virtual carrier specific aspects or implementations, thereby potentially optimizing the use of narrow-band virtual carriers, as LTE has been designed with the larger-band host carriers in mind.

Downlink Virtual Carrier Detection

As discussed above, the virtual carrier terminal should locate (within the time-frequency resource grid of the host carrier) the virtual carrier before it can receive and decode transmissions on the virtual carrier. Several alternatives are available for the virtual carrier presence and location determination, which can be implemented separately or in combination. Some of these options are discussed below.

To facilitate the virtual carrier detection, the virtual carrier location information may be provided to the virtual carrier terminal such that it can locate the virtual carrier, if any exists, more easily. For example, such location information may comprise an indication that one or more virtual carriers are provided within the host carrier, or that the host carrier does not currently provide any virtual carrier. It may also comprise an indication of the virtual carrier's bandwidth, for example in MHz or blocks of resource elements. Alternatively, or in combination, the virtual carrier location information may comprise the virtual carrier's centre frequency and bandwidth, thereby giving the virtual carrier terminal the location and bandwidth of any active virtual carrier. In the event the virtual carrier is to be found at a different frequency position in each sub-frame, according, for example, to a pseudo-random hopping algorithm, the location information can, for example, indicate a pseudo random parameter. Such parameters may include a starting frame and parameters used for the pseudo-random algorithm. Using these pseudo-random parameters, the virtual carrier terminal can then know where the virtual carrier can be found for any sub-frame.

Figure 8:
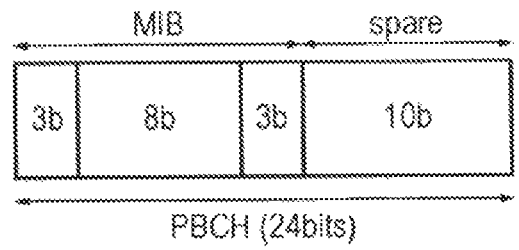
FIG. 8 provides a schematic diagram illustrating a physical broadcast channel (PBCH)
Figure 9:
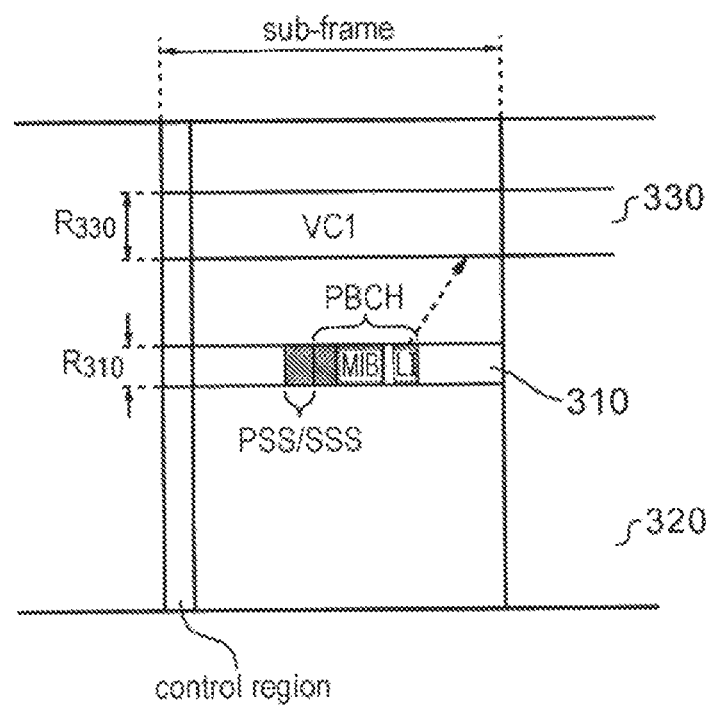
FIG. 9 provides a schematic diagram illustrating an LTE downlink radio sub-frame in accordance with an embodiment of the present invention.

On implementation feature associated with little change to the virtual carrier terminal (as compared with a conventional LTE terminal) would be to include location information for the virtual carrier within the PBCH, which already carries the Master Information Block, or MIB in the host carrier centre band. As shown in FIG. 8, the MIB consists of 24 bits (3 bits to indicate DL bandwidth, 8 bits to indicate the System Frame Number or SFN, and 3 bits regarding the PHICH configuration). The MIB therefore comprises 10 spare bits that can be used to carry location information in respect of one or more virtual carriers. For example, FIG. 9 shows an example where the PBCH includes the MIB and location information ("LI") for pointing any virtual carrier terminal to a virtual carrier.

Alternatively, virtual carrier location information could be provided in the centre band, outside of the PBCH. It can for example be always provided after and adjacent to the PBCH. By providing the location information in the centre band but outside of the PBCH, the conventional PBCH is not modified for the purpose of using virtual carriers, but a virtual carrier terminal can easily find the location information in order to detect the virtual carrier, if any.

The virtual carrier location information, if provided, can be provided elsewhere in the host carrier, but it may be advantageous to provide it in the centre band, for example because a virtual carrier terminal may configure its receiver to operate on the centre band and the virtual carrier terminal then does not need to adjust its receiver settings for finding the location information.

Depending on the amount of virtual carrier location information provided, the virtual carrier terminal can either adjust its receiver to receive the virtual carrier transmissions, or it may require further location information before it can do so.

If for example, the virtual carrier terminal was provided with location information indicating a virtual carrier presence and/or a virtual carrier bandwidth but not indicating any details as to the exact virtual carrier frequency range, or if the virtual carrier terminal was not provided with any location information, the virtual carrier terminal could then scan the host carrier for a virtual carrier (e.g. performing a so-called blind search process). Scanning the host carrier for a virtual carrier can be based on different approaches, some of which will be presented below.

Figure 10:
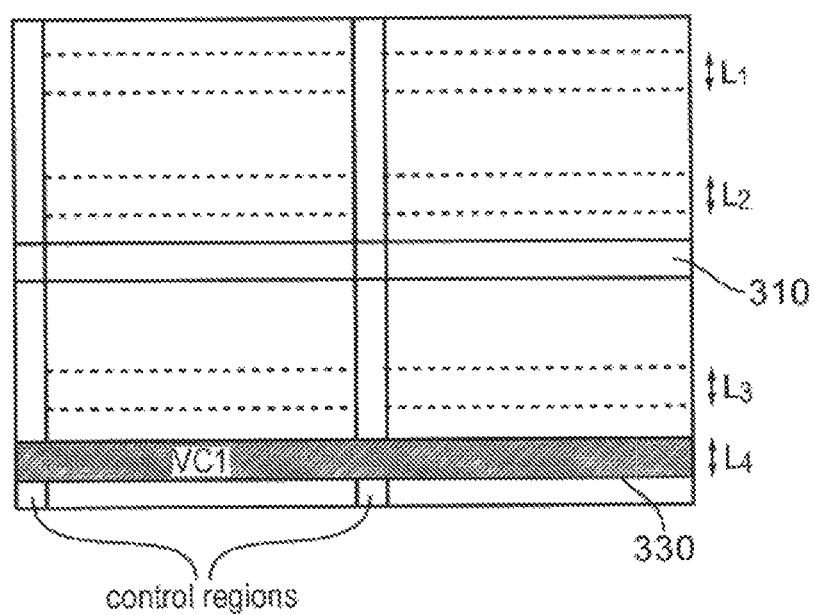
FIG. 10 provides a schematic diagram illustrating an LTE downlink radio sub-frame in which a virtual carrier has been inserted in accordance with an embodiment of the invention.
Figure 11A:
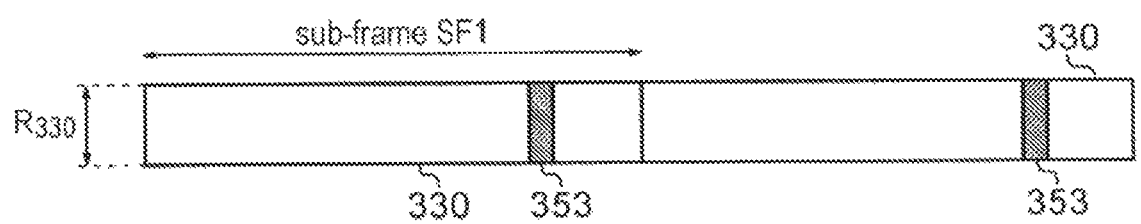
FIGS. 11A to 11D provide schematic diagrams illustrating positioning of location signals within a LTE downlink sub-frame according to embodiments of the present invention.
Figure 11B:
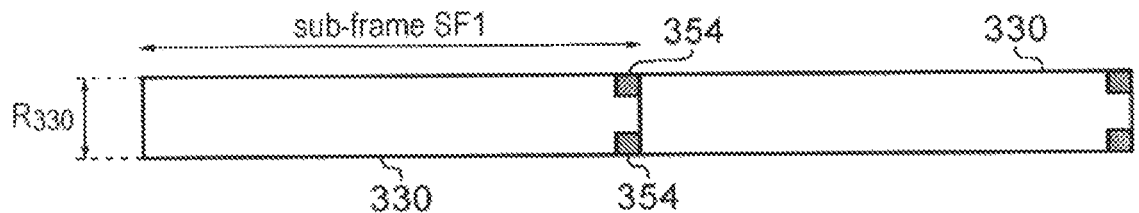
Figure 11C:
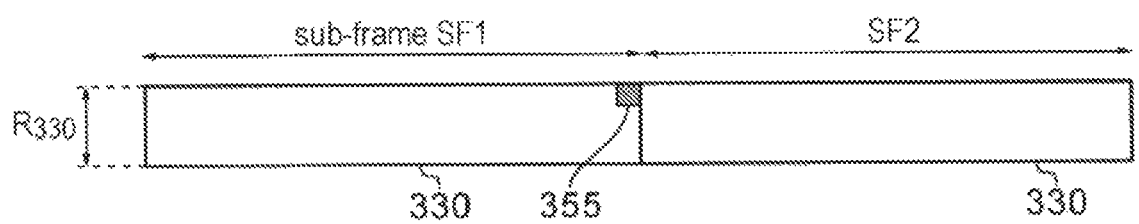

According to a first approach, a virtual carrier might only be inserted in certain predetermined locations, as illustrated for example in FIG. 10 for a four-location example. The virtual carrier terminal then scans the four locations L1-L4 for any virtual carrier. If and when the virtual carrier terminal detects a virtual carrier, it can then "camp-on" the virtual carrier to receive downlink data as described above. In this approach, the virtual carrier terminal may be provided with the possible virtual carrier locations in advance, for example they may be stored as a network-specific setting in an internal memory. Detection of a virtual carrier could be accomplished by seeking to decode a particular physical channel on the virtual carrier. The successful decoding of such a channel, indicated for example by a successful cyclic redundancy check (CRC) on decoded data, would indicate the successful location of the virtual carrier According to a second approach, the virtual carrier may include location signals such that a virtual carrier terminal scanning the host carrier can detect such signals to identify the presence of a virtual carrier. Examples of possible location signals are illustrated in FIGS. 11A to 11D. In the examples of FIGS. 11A to 11C, the virtual carrier regularly sends an arbitrary location signal such that a terminal scanning a frequency range where the location signal is would detect this signal. An "arbitrary" signal is intended here to include any signal that does not carry any information as such, or is not meant to be interpreted, but merely includes a specific signal or pattern that a virtual carrier terminal can detect. This can for example be a series of positive bits across the entire location signal, an alternation of 0 and 1 across the location signal, or any other suitable arbitrary signal. It is noteworthy that the location signal may be made of adjacent blocks of resource elements or may be formed of non adjacent blocks. For example, it may be located at every other block of resource elements at the "top" (i.e. upper frequency limit) of the virtual carrier.

In the example of FIG. 11A, the location signal 353 extends across the range $R_{330}$ of the virtual carrier 330 and is always found at the same position in the virtual carrier within a sub-frame. If the virtual carrier terminal knows where to look for a location signal in a virtual carrier sub-frame, it can then simplify its scanning process by only scanning this position within a sub-frame for a location signal. FIG. 11B shows a similar example where every sub-frame includes a location signal 354 comprising two parts: one at the top corner and one at the bottom corner of the virtual carrier sub-frame, at the end of this sub-frame. Such a location signal may be useful if, for example, the virtual carrier terminal does not know the bandwidth of the virtual carrier in advance as it can facilitate a clear detection of the top and bottom frequency edges of the virtual carrier band.

In the example of FIG. 11C, a location signal 355 is provided in a first sub-frame SF1, but not in a second sub-frame SF2. The location signal can for example be provided every two sub-frames. The frequency of the location signals can be chosen to adjust a balance between reducing scanning time and reducing overhead. In other words, the more often the location signal is provided, the less long it takes a terminal to detect a virtual carrier but the more overhead there is.

Figure 11D:
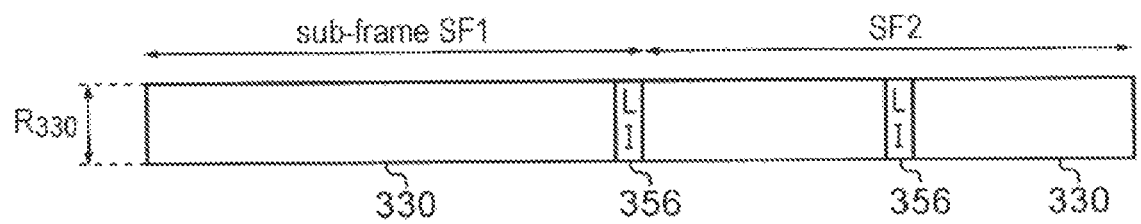

In the example of FIG. 11D, a location signal is provided where this location signal is not an arbitrary signal as in FIGS. 11A to 11C, but is a signal that includes information for virtual carrier terminals. The virtual carrier terminals can detect this signal when they scan for a virtual carrier and the signal may include information in respect of, for example, the virtual carrier bandwidth or any other virtual carrier-related information (location or non-location information). When detecting this signal, the virtual carrier terminal can thereby detect the presence and location of the virtual carrier. As shown in FIG. 11D, the location signal can, like an arbitrary location signal, be found at different locations within the sub-frame, and the location may vary on a per-sub-frame basis.

Dynamic Variation of Control Region Size of Host Carrier

As explained above, in LTE the number of symbols that make up the control region of a downlink sub-frame varies dynamically depending on the quantity of control data that needs to be transmitted. Typically, this variation is between one and three symbols. As will be understood with reference to FIG. 5, variation in the width of the host carrier control region will cause a corresponding variance in the number of symbols available for the virtual carrier. For example, as can be seen in FIG. 5, when the control region is three symbols in length and there are 14 symbols in the sub-frame, the virtual carrier is eleven symbols long. However, if in the next sub-frame the control region of the host carrier were reduced to one symbol, there would be thirteen symbols available for the virtual carrier in that sub-frame.

When a virtual carrier is inserted into a LTE host carrier, mobile communication terminals receiving data on the virtual carrier need to be able to determine the number of symbols in the control region of each host carrier sub-frame to determine the number of symbols in the virtual carrier in that sub-frame if they are to be able to use all available symbols that are not used by the host carrier control region.

Conventionally, the number of symbols forming the control region is signalled in the first symbol of every sub-frame in the PCFICH. However, the PCFICH is typically distributed across the entire bandwidth of the downlink LTE sub-frame and is therefore transmitted on sub-carriers which virtual carrier terminals capable only of receiving the virtual carrier cannot receive. Accordingly, in one embodiment, any symbols across which the control region could possibly extend are predefined as null symbols on the virtual carrier, i.e. the length of the virtual sub-carrier is set at (m–n) symbols, where m is the total number of symbols in a sub-frame and n is the maximum number of symbols of the control region. Thus, resource elements are never allocated for downlink data transmission on the virtual carrier during the first n symbols of any given sub-frame.

Although this embodiment is simple to implement it will be spectrally inefficient because during sub-frames when the control region of the host carrier has fewer than the maximum number of symbols, there will be unused symbols in the virtual carrier.

In another embodiment, the number of symbols in the control region of the host carrier is explicitly signalled in the virtual carrier itself. Once the number of symbols in the control region of the host carrier is known, the number of symbols in the virtual carrier can be calculated by subtracting the total number of symbols in the sub-frame from this number.

In one example an explicit indication of the host carrier control region size is given by certain information bits in the virtual carrier control region. In other words an explicit signalling message is inserted at a predefined position in the virtual carrier control region 502. This predefined position is known by each terminal adapted to receive data on the virtual carrier.

In another example, the virtual carrier includes a predefined signal, the location of which indicates the number of symbols in the control region of the host carriers. For example, a predefined signal could be transmitted on one of three predetermined blocks of resource elements. When a terminal receives the sub-frame it scans for the predefined signal. If the predefined signal is found in the first block of resource elements this indicates that the control region of the host carrier comprises one symbol; if the predefined signal is found in the second block of resource elements this indicates that the control region of the host carrier comprises two symbols and if the predefined signal is found in the third block of resource elements this indicates that the control region of the host carrier comprises three symbols.

In another example, the virtual carrier terminal is arranged to first attempt to decode the virtual carrier assuming that the control region size of the host carrier is one symbol. If this is not successful, the virtual carrier terminal attempts to decode the virtual carrier assuming that the control region size of the host carrier is two and so on, until the virtual carrier terminal successfully decodes the virtual carrier.

Downlink Virtual Carrier Reference Signals

As is known in the art, in OFDM-based transmission systems, such as LTE, a number of sub-carriers in symbols throughout the sub-frames are typically reserved for the transmission of reference signals. The reference signals are transmitted on sub-carriers distributed throughout a sub-frame across the channel bandwidth and across the OFDM symbols. The reference signals are arranged in a repeating pattern and can be used by a receiver to estimate the channel function applied to the data transmitted on each sub-carrier using extrapolation and interpolation techniques. These reference signals are also typically used for additional purposes such as determining metrics for received signal power indications, automatic frequency control metrics and automatic gain control metrics. In LTE the positions of the reference signal bearing sub-carriers within each sub-frame are predefined and are therefore known at the receiver of each terminal.

In LTE downlink sub-frames, reference signals from each transmit antenna port are typically inserted on every sixth sub-carrier. Accordingly, if a virtual carrier is inserted in an LTE downlink sub-frame, even if the virtual carrier has a minimum bandwidth of one resource block (i.e. twelve sub-carriers) the virtual carrier will include at least some reference signal bearing sub-carriers.

There are sufficient reference signal bearing sub-carriers provided in each sub-frame such that a receiver need not accurately receive every single reference signal to decode the data transmitted on the sub-frame. However, as will be understood the more reference signals that are received, the better a receiver will generally be able to estimate the channel response, and hence fewer errors will typically be introduced into the data decoded from the sub-frame. Accordingly, in order to preserve compatibility with LTE communication terminals receiving data on the host carrier, in accordance with some examples of the present invention, the sub-carrier positions that would contain reference signals in a conventional LTE sub-frame are retained in the virtual carrier.

As will be understood, in accordance with examples of the present invention, terminals arranged to receive only the virtual carrier receive a reduced number of sub-carriers compared to conventional LTE terminals which receive each sub-frame across the entire bandwidth of the sub-frame. As a result, the reduced capability terminals receive fewer reference signals over a narrower range of frequencies which may result in a less accurate channel estimation being generated.

In some examples a simplified virtual carrier terminal may have a lower mobility which requires fewer reference symbols to support channel estimation. However, in some examples of the present invention the downlink virtual carrier includes additional reference signal bearing sub-carriers to enhance the accuracy of the channel estimation that the reduced capability terminals can generate.

In some examples the positions of the additional reference bearing sub-carriers are such that they are systematically interspersed with respect to the positions of the conventional reference signal bearing sub-carriers thereby increasing the sampling frequency of the channel estimation when combined with the reference signals from the existing reference signal bearing sub-carriers. This allows an improved channel estimation of the channel to be generated by the reduced capability terminals across the bandwidth of the virtual carrier. In other examples, the positions of the additional reference bearing sub-carriers are such that they are systematically placed at the edge of the bandwidth of the virtual carrier thereby increasing the interpolation accuracy of the virtual carrier channel estimates.

Alternative Virtual Carrier Arrangements

Figure 12:
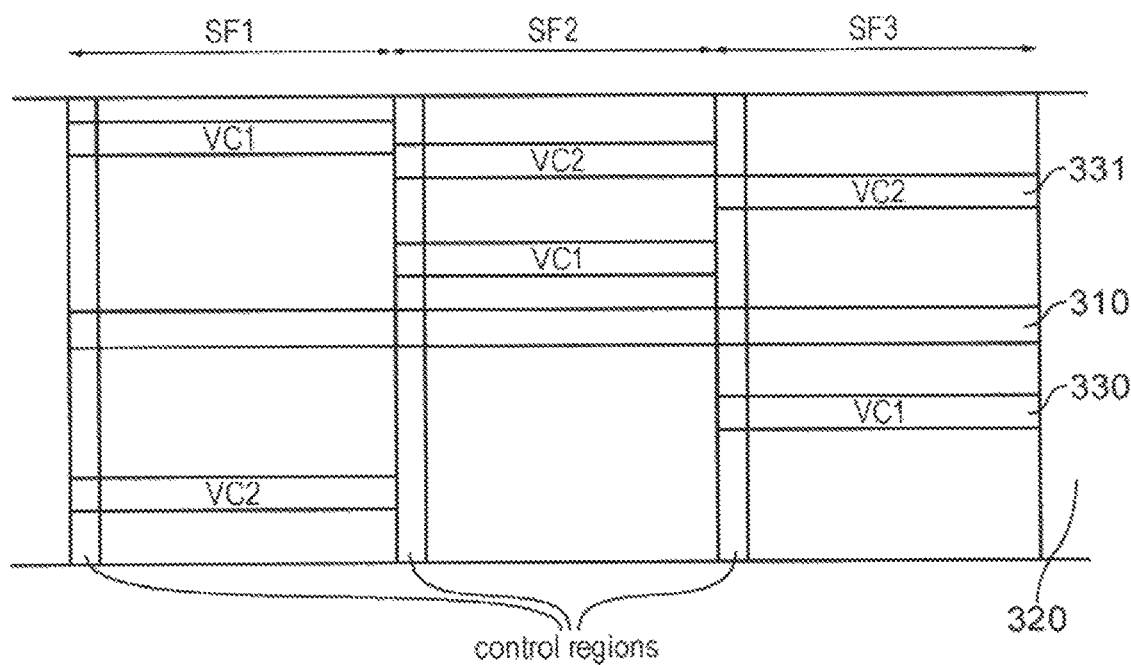
FIG. 12 provides a schematic diagram illustrating a group of sub-frames in which two virtual carriers change location within a host carrier band according to an embodiment of the present invention.

So far examples of the invention have been described generally in terms of a host carrier in which a single virtual carrier has been inserted as shown for example in FIG. 5. However, in some examples a host carrier may include more than one virtual carrier as shown for example in FIG. 12. FIG. 12 shows an example in which two virtual carriers VC1 (330) and VC2 (331) are provided within a host carrier 320. In this example, the two virtual carriers change location within the host carrier band according to a pseudo-random algorithm. However, in other examples, one or both of the two virtual carriers may always be found in the same frequency range within the host carrier frequency range and/or may change position according to a different mechanism. In LTE, the number of virtual carriers within a host carrier is only limited by the size of the host carrier. However, too many virtual carriers within the host carrier may unduly limit the bandwidth available for transmitting data to conventional LTE terminals and an operator may therefore decide on a number of virtual carrier within a host carrier according to, for example, a ratio of conventional LTE users/virtual carrier users.

In some examples the number of active virtual carriers can be dynamically adjusted such that it fits the current needs of conventional LTE terminals and virtual carrier terminals. For example, if no virtual carrier terminal is connected or if their access is to be intentionally limited, the network can arrange to begin scheduling the transmission of data to LTE terminals within the sub-carriers previously reserved for the virtual carrier. This process can be reversed if the number of active virtual carrier terminals begins to increase. In some examples the number of virtual carriers provided may be increased in response to an increase in the presence of virtual carrier terminals. For example if the number of virtual terminals present in a network or area of a network exceeds a threshold value, an additional virtual carrier is inserted in the host carrier. The network elements and/or network operator can thus activate or deactivate the virtual carriers whenever appropriate.

The virtual carrier shown for example in FIG. 5 is 144 sub-carriers in bandwidth. However, in other examples a virtual carrier may be of any size between twelve sub-carriers to 1188 sub-carriers (for a carrier with a 1200 sub-carrier transmission bandwidth). Because in LTE the centre band has a bandwidth of 72 sub-carriers, a virtual carrier terminal in an LTE environment preferentially has a receiver bandwidth of at least 72 sub-carriers (1.08 MHz) such that it can decode the centre band 310, therefore a 72 sub-carrier virtual carrier may provide a convenient implementation option. With a virtual carrier comprising 72 sub-carriers, the virtual carrier terminal does not have to adjust the receiver's bandwidth for camping on the virtual carrier which may therefore reduce complexity of performing the camp-on process, but there is no requirement to have the same bandwidth for the virtual carrier as for the centre band and, as explained above, a virtual carrier based on LTE can be of any size between 12 to 1188 sub-carriers. For example, in some systems, a virtual carrier having a bandwidth of less than 72 sub-carriers may be considered as a waste of the virtual carrier terminal's receiver resources, but from another point of view, it may be considered as reducing the impact of the virtual carrier on the host carrier by increasing the bandwidth available to conventional LTE terminals. The bandwidth of a virtual carrier can therefore be adjusted to achieve the desired balance between complexity, resource utilization, host carrier performance and requirements for virtual carrier terminals.

Unlink Transmission Frame

So far, the virtual carrier has been discussed primarily with reference to the downlink, however in some examples a virtual carrier can also be inserted in the uplink.

In frequency division duplex (FDD) networks both the uplink and downlink are active in all sub-frames, whereas in time division duplex (TDD) networks sub-frames can either be assigned to the uplink, to the downlink, or further sub-divided into uplink and downlink portions.

In order to initiate a connection to a network, conventional LTE terminals make a random access request on the physical random access channel (PRACH). The PRACH is located in predetermined blocks of resource elements in the uplink frame, the positions of which are signaled to the LTE terminals in the system information signaled on the downlink.

Additionally, when there is pending uplink data to be transmitted from an LTE terminal and the terminal does not already have any uplink resources allocated to it, it can transmit a random access request PRACH to the base station. A decision is then made at the base station as to which if any uplink resource is to be allocated to the terminal device that has made the request. Uplink resource allocations are then signaled to the LTE terminal on the physical downlink control channel (PDCCH) transmitted in the control region of the downlink sub-frame.

In LTE, transmissions from each terminal device are constrained to occupy a set of contiguous resource blocks in a frame. For the physical uplink shared channel (PUSCH) the uplink resource allocation grant received from the base station will indicate which set of resource blocks to use for that transmission, where these resource blocks could be located anywhere within the channel bandwidth.

The first resources used by the LTE physical uplink control channel (PUCCH) are located at both the upper and lower edge of the channel, where each PUCCH transmission occupies one resource block. In the first half of a sub-frame this resource block is located at one channel edge, and in the second half of a sub-frame this resource block is located at the opposite channel edge. As more PUCCH resources are required, additional resource blocks are assigned in a sequential manner, moving inward from the channel edges. Since PUCCH signals are code division multiplexed, an LTE uplink can accommodate multiple PUCCH transmissions in the same resource block.

Virtual Uplink Carrier

In accordance with embodiments of the present invention, the virtual carrier terminals described above can also be provided with a reduced capability transmitter for transmitting uplink data. The virtual carrier terminals are arranged to transmit data across a reduced bandwidth. The provision of a reduced capability transmitter unit provides corresponding advantages to those achieved by providing a reduced capability receiver unit with, for example, classes of devices that are manufactured with a reduced capability for use with, for example, MTC type applications.

Figure 13A:
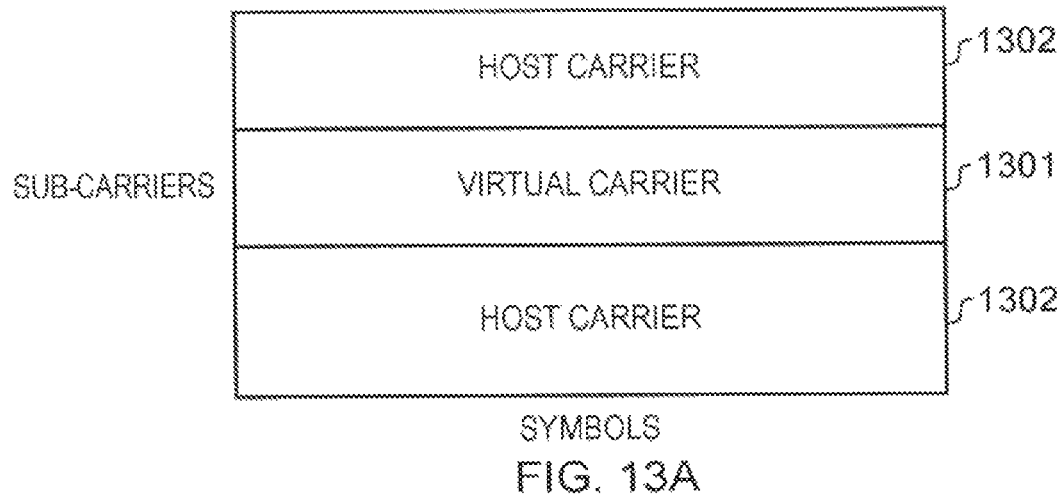
FIGS. 13A to 13C provide schematic diagrams illustrating LTE uplink sub-frames in which an uplink virtual carrier has been inserted in accordance with an embodiment of the present invention.

In correspondence with the downlink virtual carrier, the virtual carrier terminals transmit uplink data across a reduced range of sub-carriers within a host carrier that has a greater bandwidth than that of the reduced bandwidth virtual carrier. This is shown in FIG. 13A. As can be seen from FIG. 13A, a group of sub-carriers in an uplink sub-frame form a virtual carrier 1301 within a host carrier 1302. Accordingly, the reduced bandwidth across which the virtual carrier terminals transmit uplink data can be considered a virtual uplink carrier.

In order to implement the virtual uplink carrier, the base station scheduler serving a virtual carrier ensures that all uplink resource elements granted to virtual carrier terminals are sub-carriers that fall within the reduced bandwidth range of the reduced capability transmitter units of the virtual carrier terminals. Correspondingly, the base station scheduler serving the host carrier typically ensures that all uplink resource elements granted to host carrier terminals are sub-carriers that fall outside the set of sub-carriers occupied by the virtual carrier terminals. However, if the schedulers for the virtual carrier and the host carrier are implemented jointly, or have means to share information, then the scheduler of the host carrier can assign resource elements from within the virtual carrier region to terminal devices on the host carrier during sub-frames when the virtual carrier scheduler indicates that some or all of the virtual carrier resources will not be used by terminal devices on the virtual carrier.

If a virtual carrier uplink incorporates a physical channel that follows a similar structure and method of operation to the LTE PUCCH, where resources for that physical channel are expected to be at the channel edges, for virtual carrier terminals these resources could be provided at the edges of the virtual carrier bandwidth and not at the edges of the host carrier. This is advantageous since it would ensure that virtual carrier uplink transmissions remain within the reduced virtual carrier bandwidth.

Virtual Uplink Carrier Random Access

In accordance with conventional LTE techniques, it cannot be guaranteed that the PRACH will be within the sub-carriers allocated to the virtual carrier. In some embodiments therefore, the base station provides a secondary PRACH within the virtual uplink carrier, the location of which can be signaled to the virtual carrier terminals via system information on the virtual carrier. This is shown for example in FIG. 13B in which a PRACH 1303 is located within the virtual carrier 1301. Thus, the virtual carrier terminals send PRACH requests on the virtual carrier PRACH within the virtual uplink carrier. The position of the PRACH can be signaled to the virtual carrier terminals in a virtual carrier downlink signaling channel, for example in system information on the virtual carrier.

Figure 13B:
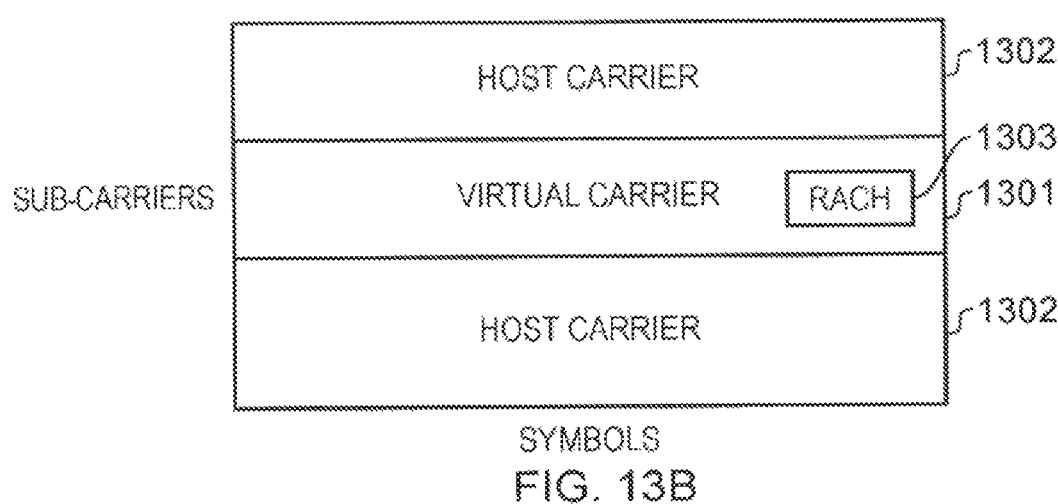
Figure 13C:
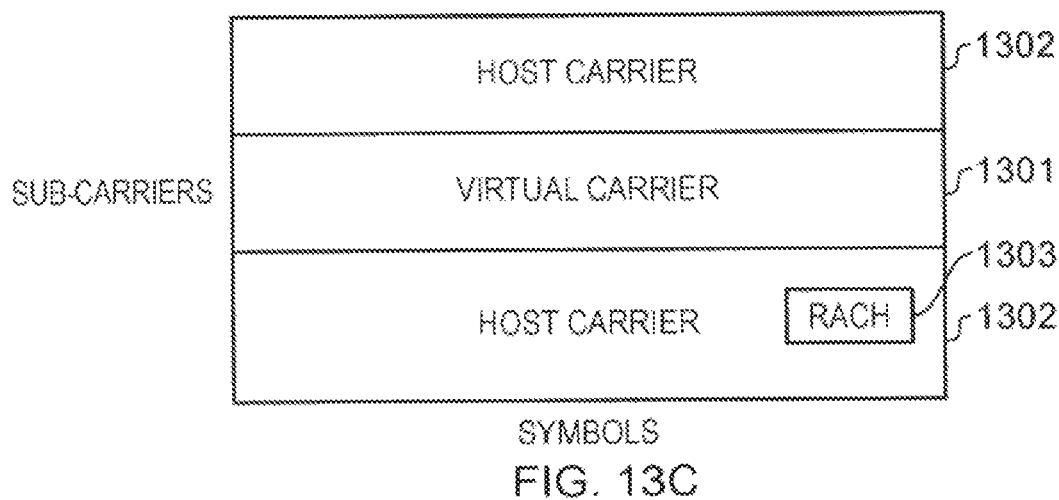

However, in other examples, the virtual carrier PRACH 1303 is situated outside of the virtual carrier as shown for example in FIG. 13C. This leaves more room within the virtual uplink carrier for the transmission of data by the virtual carrier terminals. The position of the virtual carrier PRACH is signaled to the virtual carrier terminals as before but in order to transmit a random access request, the virtual carrier terminals re-tune their transmitter units to the virtual carrier PRACH frequency because it is outside of the virtual carrier. The transmitter units are then re-tuned to the virtual carrier frequency when uplink resource elements have been allocated.

In some examples where the virtual carrier terminals are capable of transmitting on a PRACH outside of the virtual carrier, the position of the host carrier PRACH can be signaled to the virtual carrier terminals. The virtual carrier terminals can then simply use the conventional host carrier PRACH resource to send random access requests. This approach is advantageous as fewer PRACH resources have to be allocated.

However, if the base station is receiving random access requests from both conventional LTE terminals and virtual carrier terminals on the same PRACH resource, it is necessary that the base station is provided with a mechanism for distinguishing between random access requests from conventional LTE terminals and random access requests from virtual carrier terminals.

Therefore, in some examples a time division allocation is implemented at the base station whereby, for example, over a first set of sub-frames the PRACH allocation is available to the virtual carrier terminals and over a second set of sub-frames the PRACH allocation is available to conventional LTE terminals. Accordingly, the base station can determine that random access requests received during the first set of sub-frames originate from virtual carrier terminals and random access requests received during the second set of sub-frames originate from conventional LTE terminals.

In other examples, no mechanism is provided to prevent both virtual carrier terminals and conventional LTE terminals transmitting random access requests at the same time. However, the random access preambles that are conventionally used to transmit a random access request are divided into two groups. The first group is used exclusively by virtual carrier terminals and the second group is used exclusively by conventional LTE terminals. Accordingly, the base station can determine whether a random request originated from a conventional LTE terminal or a virtual carrier terminal simply by ascertaining to what group the random access preamble belongs.

Example Architecture

Figure 14:
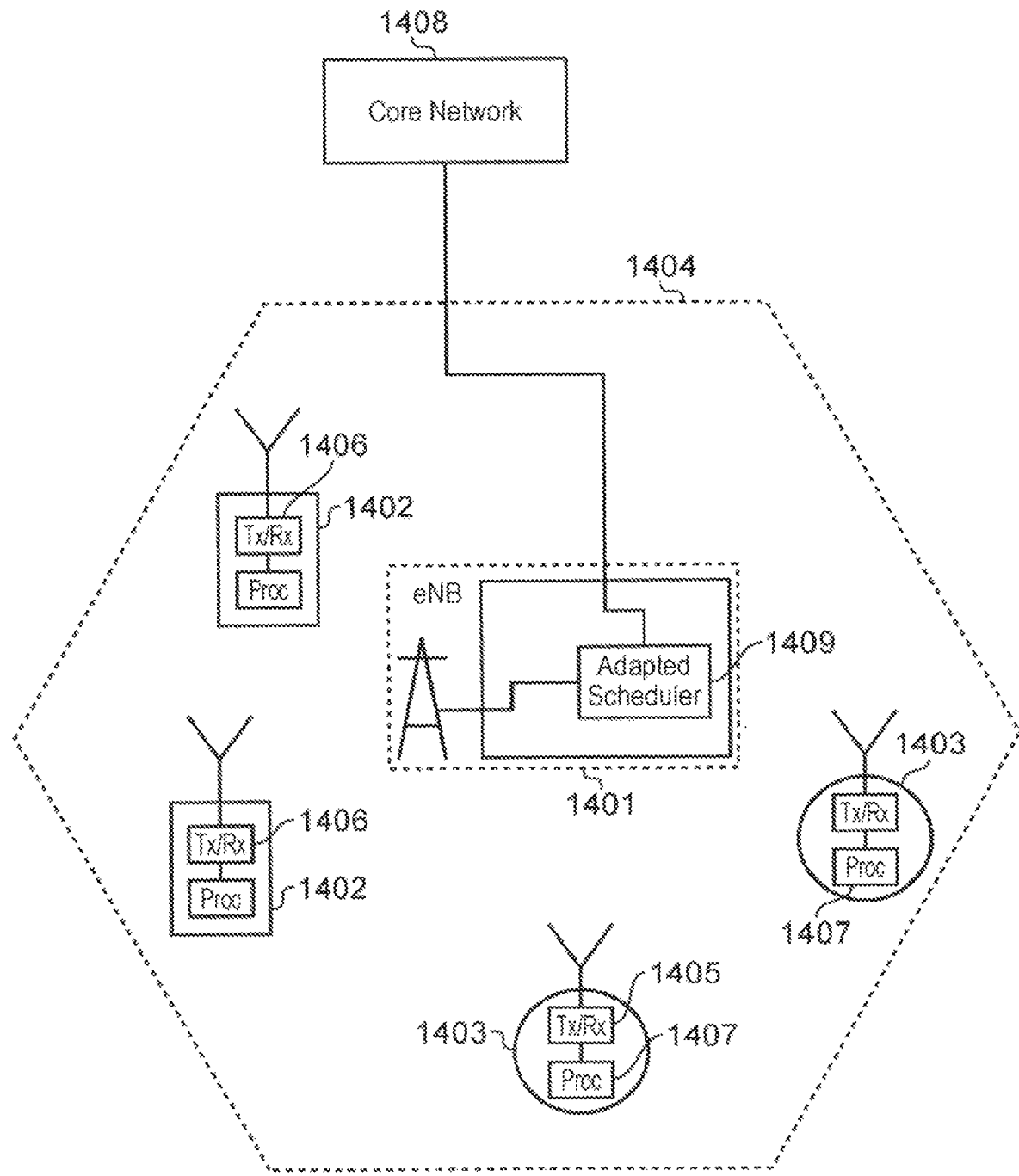
FIG. 14 provides a schematic diagram showing part of an adapted LTE mobile telecommunication network arranged in accordance with an example of the present invention.

FIG. 14 provides a schematic diagram showing part of an adapted LTE mobile telecommunication system arranged in accordance with an example of the present invention. The system includes an adapted enhanced Node B (eNB) 1401 connected to a core network 1408 which communicates data to a plurality of conventional LTE terminals 1402 and reduced capability terminals 1403 within a coverage area (cell) 1404. Each of the reduced capability terminals 1403 has a transceiver unit 1405 which includes a receiver unit capable of receiving data across a reduced bandwidth and a transmitter unit capable of transmitting data across a reduced bandwidth when compared with the capabilities of the transceiver units 1406 included in the conventional LTE terminals 1402.

The adapted eNB 1401 is arranged to transmit downlink data using a sub-frame structure that includes a virtual carrier as described with reference to FIG. 5 and to receive uplink data using a sub-frame structure as described with reference to FIG. 13B or 13C. The reduced capability terminals 1403 are thus able to receive and transmit data using the uplink and downlink virtual carriers as described above.

As has been explained above, because the reduced complexity terminals 1403 receive and transmit data across a reduced bandwidth on the uplink and downlink virtual carriers, the complexity, power consumption and cost of the transceiver unit 1405 needed to receive and decode downlink data and to encode and transmit uplink data is reduced compared to the transceiver unit 1406 provided in the conventional LTE terminals.

When receiving downlink data from the core network 1408 to be transmitted to one of the terminals within the cell 1404, the adapted eNB 1401 is arranged to determine if the data is bound for a conventional LTE terminal 1402 or a reduced capability terminal 1403. This can be achieved using any suitable technique. For example, data bound for a reduced capability terminal 1403 may include a virtual carrier flag indicating that the data must be transmitted on the downlink virtual carrier. If the adapted eNB 1401 detects that downlink data is to be transmitted to a reduced capability terminal 1403, an adapted scheduling unit 1409 included in the adapted eNB 1401 ensures that the downlink data is transmitted to the reduced capability terminal in question on the downlink virtual. In another example the network is arranged so that the virtual carrier is logically independent of the eNB. More particularly the virtual carrier may be arranged to appear to the core network as a distinct cell so that it is not known to the core network that the virtual carrier has any relationship with the host carrier. Packets are simply routed to/from the virtual carrier just as they would be for a conventional cell.

In another example, packet inspection is performed at a suitable point within the network to route traffic to or from the appropriate carrier (i.e. the host carrier or the virtual carrier).

In yet another example, data from the core network to the eNB is communicated on a specific logical connection for a specific terminal device. The eNB is provided with information indicating which logical connection is associated with which terminal device. Information is also provided at the eNB indicating which terminal devices are virtual carrier terminals and which are conventional LTE terminals. This information could be derived from the fact that a virtual carrier terminal would initially have connected using virtual carrier resources. In other examples virtual carrier terminals are arranged to indicate their capability to the eNB during the connection procedure. Accordingly the eNB can map data from the core network to a specific terminal device based on whether the terminal device is a virtual carrier terminal or an LTE terminal.

When scheduling resources for the transmission of uplink data, the adapted eNB 1401 is arranged to determine if the terminal to be scheduled resources is a reduced capability terminal 1403 or a conventional LTE terminal 1402. In some examples this is achieved by analysing the random access request transmitted on the PRACH using the techniques to distinguish between a virtual carrier random access request and a conventional random access request as described above. In any case, when it has been determined at the adapted eNB 1401 that a random access request has been made by a reduced capability terminal 1402, the adapted scheduler 1409 is arranged to ensure that any grants of uplink resource elements are within the virtual uplink carrier.

In some examples, the virtual carrier inserted within the host carrier can be used to provide a logically distinct "network within a network". In other words data being transmitted via the virtual carrier can be treated as logically and physically distinct from the data transmitted by the host carrier network. The virtual carrier can therefore be used to implement a so-called dedicated messaging network (DMN) which is "laid over" a conventional network and used to communicate messaging data to DMN devices (i.e. virtual carrier terminals).

Further Example Applications of Virtual Carriers

Having set out the concepts of virtual carriers of the kind described in co-pending UK patent applications numbered GB 1101970.0 [2], GB 1101981.7 [3], GB 1101966.8 [4], GB 1101983.3 [5], GB 1101853.8 [6], GB 1101982.5 [7], GB 1101980.9 [8] and GB 1101972.6 [9], some extensions of the virtual carrier concept in accordance with embodiments of the invention are now described. In particular, some implementations of virtual carrier concepts in the context of multicast transmissions are described.

Before describing some example applications of the virtual carrier concept in the context of multicast transmissions, some general characteristics of frame structures for uplink and downlink transmissions in an example telecommunications system implementing a virtual carrier in accordance with embodiments of the invention are summarised.

Figure 15:
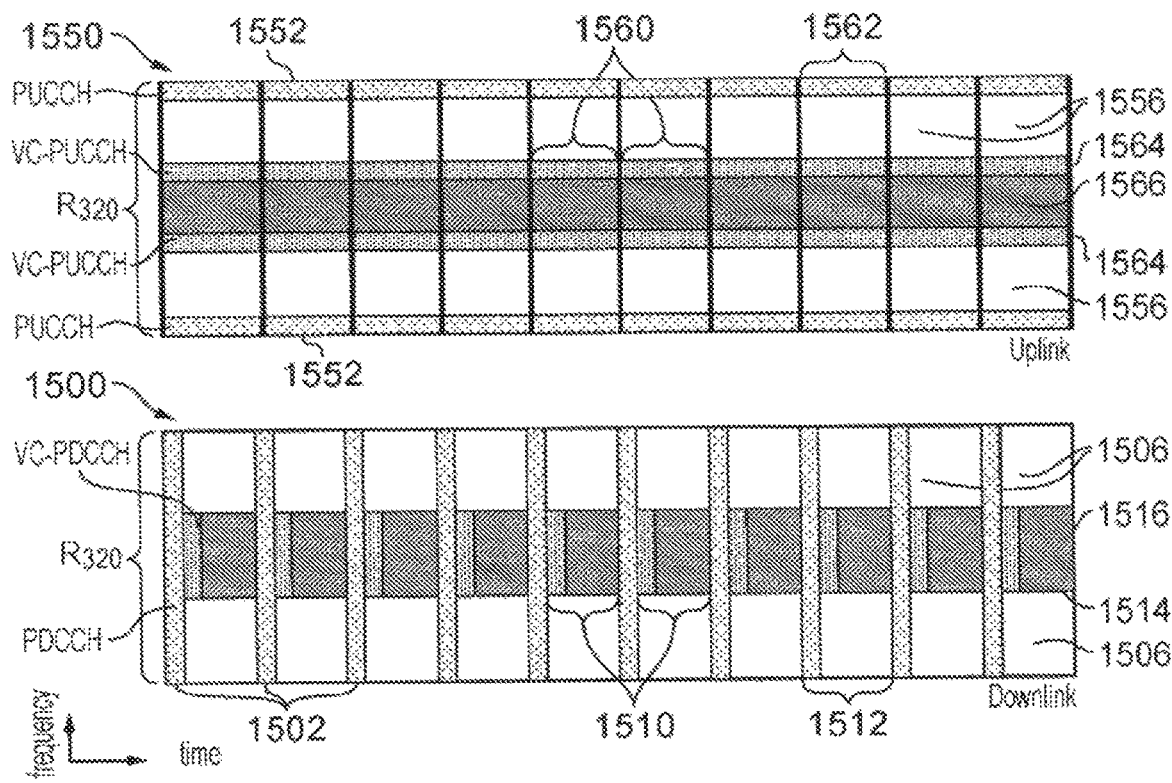
FIG. 15 schematically represents an example allocation of transmission resources between a host and virtual carrier for both uplink and downlink in a LTE mobile telecommunication network arranged according to an embodiment of the invention.

FIG. 15 is a schematic diagram representing how various regions in a LTE-type telecommunications network's time-frequency uplink resource grid 1550 and downlink resource grid 1500 might be allocated to support a virtual carrier such as described above. The upper grid 1550 in FIG. 15 schematically represents the uplink resource allocation and the lower grid 1500 schematically represents the downlink resource allocation.

The extent of the example downlink resource grid 1500 shown in FIG. 15 comprises ten sub-frames 1512 (equivalent to one frame overall) spaced along the horizontal time direction and spans a bandwidth $R_{320}$ in frequency, for example 20 MHz. As described above, the downlink transmission resource grid 1500 of FIG. 15 comprises host carrier PDCCH regions 1502, host carrier PDSCH regions 1506 and virtual carrier regions 1510. The virtual carrier regions 1510 in this example comprise separate virtual carrier PDCCH regions 1514 and virtual carrier PDSCH regions 1516. However, and as noted above, in other example implementations the principles of the virtual carrier operation might not mirror these aspects of LTE-type networks. The downlink frame structure 1500 may include other regions, such as reference symbol regions, but these are not shown in FIG. 15 for simplicity. Each sub-frame 1512 of the downlink resource grid 1500 shown in FIG. 15 broadly follows the same general format as the sub-frame shown in FIG. 5, except in this particular example the virtual carrier control region (VC-PDCCH) 1512 is positioned at the beginning of each sub-frame 1512, rather than at the end as schematically shown in FIG. 5.

The extent of the uplink resource grid 1550 shown in FIG. 15 also comprises ten sub-frames 1562 (equivalent to one frame overall) spaced along the horizontal time direction and spanning the same bandwidth $R_{320}$ in frequency. The uplink transmission resource grid 1550 of FIG. 15 comprises host carrier PUCCH regions 1552 (HC control regions), host carrier PUSCH regions 1556, and virtual carrier regions 1560. The respective virtual carrier regions 1560 comprise virtual carrier PUCCH regions 1564 (VC control regions) and virtual carrier PUSCH regions 1566. The uplink frame structure 1550 can include other regions, but these are again not shown in FIG. 15 for simplicity. Each sub-frame 1552 of the uplink resource grid 1550 shown in FIG. 15 may broadly follow the same general format as the sub-frames shown in FIGS. 13A to 13C, for example.

Having summarised some aspects of uplink and downlink transmission resource grids in telecommunications systems implementing a virtual carrier in accordance with some embodiments of the invention, some applications of multicast techniques in such a system are now described.

Multicasting is an established technique used in various telecommunication systems, such as those operating in accordance with the general principles of the 3GPP LTE standards. Multicasting may be generally characterised as the simultaneous transmission of data to multiple terminal devices which are members of a group defined for receiving the multicast data. Multicast services may be contrasted with broadcast services and unicast services. For example, broadcast services may be generally characterised by the transmission of data which can be received by multiple terminal devices without the devices needing to be part of any particular defined sub-group of terminal devices. Unicast services, on the other hand, may be generally characterised by the transmission of data intended for an individual terminal device with the data being specifically addressed to that terminal device.

The inventors have recognized that multicasting may be a particularly useful mode for communicating data to machine-type communication terminal devices of the kind discussed above and which might frequently, though not exclusively, be associated with virtual carriers. This is because in many situations it is expected there will be large numbers of machine-type communication terminals to which the same data is to be transmitted. For example, a utilities provider may wish to communicate new pricing information or a software update to all smart meters within a given communication cell, or a vending machine operator may wish to communicate new pricing information to vending machines configured as MTC devices (i.e. having the ability to wirelessly communicate data with an MTC server using a wireless telecommunication system). Corresponding situations requiring the transmission of the same data to multiple terminal devices may arise in other circumstances, for example, with so-called smart grids and remote health care implementations of machine-type communication networks/devices. Thus it is expected there will be many circumstances in which a virtual carrier of the kind discussed above may be employed to support multicast transmissions.

Figure 16:
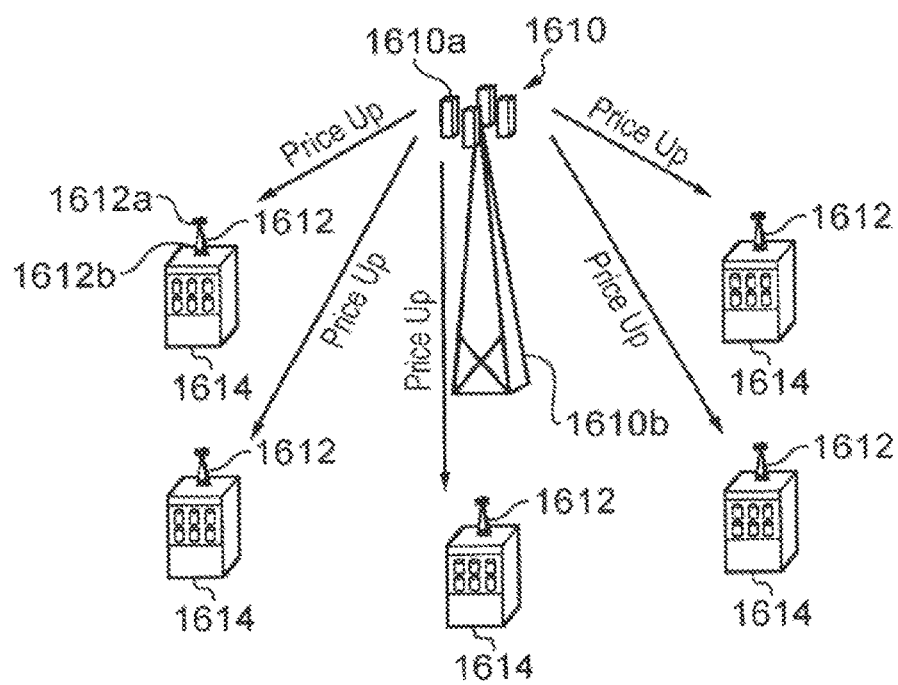
FIG. 16 schematically shows a mobile telecommunication network architecture configured to operate in accordance with an embodiment of the invention.

One example situation is schematically shown in FIG. 16 which represents an architecture for a generally LTE-based telecommunications system 1600 implementing a multicast service in accordance with an embodiment of the invention. The system 1600 comprises an eNodeB (base station) 1610 arranged to communicate with a plurality of terminal devices 1612 over a virtual carrier of the kind described above. Although only one base station 1610 is shown in FIG. 16 for simplicity, it will be appreciated that in general there will be multiple base stations to provide coverage for terminal devices over a range of different geographic locations (i.e. in different cells of the network).

The terminal devices 1612 are communicatively coupled to associated "machines" 1614, which in the example shown in FIG. 16 are vending machines 1614. Thus the terminal devices 1612 provide a means for the vending machines to communicate, via the base station 1610, with a remote MTC server (not shown) through the telecommunications network 1600. As is conventional, the base station 1610 may comprise a transceiver unit 1610a for transmission and reception of wireless signals and a controller unit 1610b configured to control the base station 1610 to operate as desired according to the principles described herein. As is also conventional, the terminal devices 1612 may each comprise a transceiver unit 1612a for transmission and reception of wireless signals and a controller unit 1612b configured to control the respective terminal devices 1612 to operate as desired according to the principles described herein. For example, the respective controller units 1610b, 1612b may comprise respective processor units which are suitably configured/programmed to provide the desired functionality using conventional programming/configuration techniques for equipment in wireless telecommunications systems.

The terminal devices 1612 are schematically represented in FIG. 16 as receiving a multicast communication from the base station 1610 indicating an increase in price should be applied for the associated vending machines. That is to say the terminal devices 1612 (perhaps along with other terminal devices in other cells served by other base stations) form a multicast group and the "price up" communication schematically represented in FIG. 16 may be addressed to this multicast group in accordance with the established general principles of multicasting, e.g. based on multicast group ID addressing. The "price up" communication may be instigated by a remote MTC server responsible for managing the operation of the network of vending machines 1614 and routed to the base station 1610 for multicast transmission to the terminal devices 1612 in accordance with generally conventional techniques. Furthermore, the terminal devices 1612 receiving the "price-up" multicast communication may be configured to extract the relevant information from the multicast communication and pass the information to their associated vending machine 1614, which may react accordingly, again using generally conventional techniques.

A potential advantage of using a multicast approach to communicate the price-up message to the terminal devices 1612 shown in FIG. 16, as compared to a unicast approach to each individual terminal device, is reduced signalling overhead. This can be the case both in terms of control-plane signalling (e.g. on the virtual carrier PDCCH 1514 shown in FIG. 15) and in terms of user-plane signalling (e.g. on the virtual carrier PDSCH shown in FIG. 15). With a large number of terminal devices in a cell, the amount of control and user-plane signalling to transfer MTC messages in a unicast manner to each individual terminal device could easily come to dominate the total available resources, making the system inefficient, and perhaps even unfeasible. Control-plane signalling may in particular become overloaded because the actual user-plane data to be communicated, e.g. a simple indication of a price increase, might in itself be relatively small.

Using multicast techniques to communicate data to multiple terminal devices can thus help reduce the amount of control signalling overhead. However, a drawback of current techniques for multicast transmissions, for example as defined in the relevant existing LTE standards, is a lack of a mechanism for terminal devices to acknowledge receipt of the transmission. This is because multicast services are unidirectional services. The present inventors have recognized this aspect of existing multicast schemes can have a detrimental impact in many situations, and in particular for some MTC applications, such as the vending machine example of FIG. 16. For example, it might be problematic if not all the vending machines 1614 successfully receive new pricing information because some of the machines will be charging the wrong price(s). Using current multicast techniques, an MTC server responsible for managing the network of vending machines 1614 would not be able to determine whether or not the respective vending machines have successfully received any given multicast transmission. Because of this the MTC server cannot know if corrective action (e.g. re-transmission of data) is required.

Telecommunications systems generally provide a mechanism for terminal devices to acknowledge correct receipt of unicast communications/packets, e.g. based on ACK/NACK signalling according to a defined ARQ (automatic repeat request)/HARQ (hybrid automatic repeat request) procedure. LTE, for example, employs a HARQ procedure as described in ETSI TS 136 213 V10.2.0 (2011-06)/3GPP TS 36.213 version 10.2.0 Release 10) [10] and ETSI TS 136 321 V10.2.0 (2011-06)/3GPP TS 36.321 version 10.2.0 Release 10) [11].

Figure 17A:
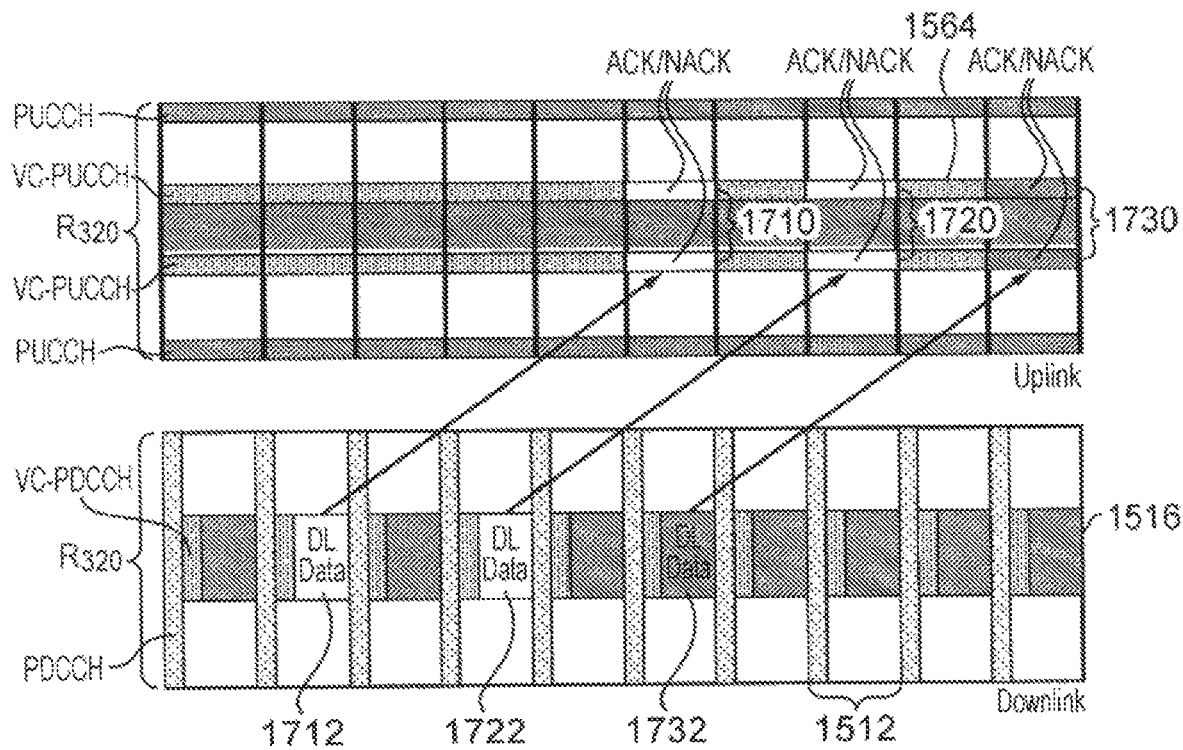
FIG. 17A schematically represents allocated resources for downlink transmissions and associated uplink acknowledgement/non-acknowledgement signals for a virtual carrier.

FIG. 17A schematically represents how the uplink and downlink transmissions resources represented in FIG. 15 might be used to provide for a HARQ procedure for a virtual carrier in a unicast context. The various elements of FIG. 17A will be understood from the above description of the corresponding elements in FIG. 15. In general, the HARQ procedure may operate in the same general way as for a conventional (i.e. non-virtual) carrier. That is to say it may operate by following the principles of conventional HARQ techniques in the telecommunications system in which the virtual carrier is implemented. In this example it is assumed the telecommunications system is a generally LTE compliant system. Thus downlink data received by a terminal device on the virtual carrier's PDSCH 1516 in sub-frame i are acknowledged/negative acknowledged by an uplink ACK/NACK signal sent on the virtual carrier's PUCCH 1564 in sub-frame i+4. This is schematically shown in FIG. 17A by three uplink ACK/NACK signal responses 1710, 1720, 1730 associated with respective downlink data transmissions 1712, 1722, 1732 from four sub-frames earlier. As with conventional LTE ACK/NACK procedures, ACK/NACK signalling may also be sent on PUSCH, for example, when a terminal device is allocated uplink resources for user-plane data on PUSCH in the same sub-frame as the ACK/NACK response.

Figure 17B:
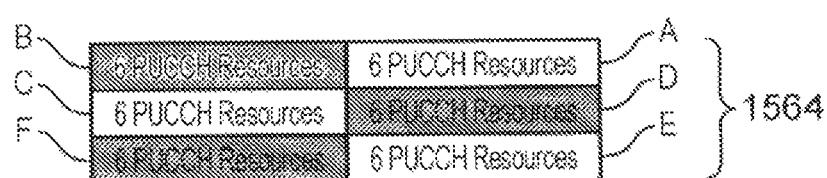
FIG. 17B schematically represents available resources for a Physical Uplink Control Channel (PUCCH) for a virtual carrier.
Figure 17B:
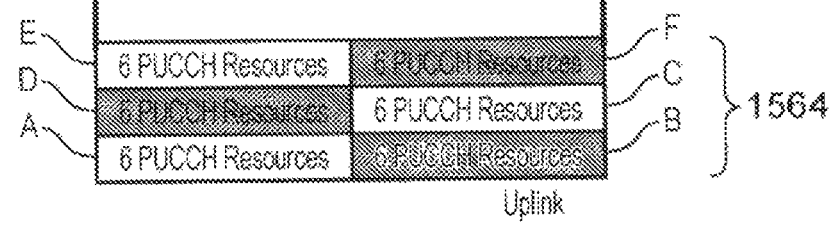

FIG. 17B schematically represents how uplink PUCCH resources 1564 might be allocated for a virtual carrier operating in accordance with an embodiment of the invention. The region of the uplink transmission resource grid shown in FIG. 17B corresponds to a single sub-frame of the uplink transmission resource grid 1550 shown in FIG. 15 for a bandwidth corresponding to the extent of the virtual carrier. It is assumed for this example that the virtual carrier PUCCH resource allocation broadly follows the same principles as for a conventional LTE carrier. Thus resources are allocated in pairs towards the upper and lower frequency boundaries/edges for the virtual carrier. In the example shown in FIG. 17B the resources associated with respective pairings are indicated by the same letter A, B, C, D, E or F. In the example shown in FIG. 17B there are enough PUCCH resources for 36 transmissions per sub-frame. The inventors have recognized that these different resources can be used by different terminal devices to send an ACK/NACK in response to a multicast transmission.

Thus some embodiments of the invention provide a method for communicating data in a wireless telecommunications system which comprises transmitting a multicast transmission from a base station to a plurality of terminal devices and receiving response signals from respective ones of the terminal devices to indicate whether or not the respective terminal devices have successfully received the multicast transmission. Furthermore, this may be done using a virtual carrier of the kind described above within the operating bandwidth of a host carrier.

This provides a mechanism for a MTC server, for example, to instigate the transmission of multicast data to a plurality of associated MTC devices, and to receive feedback via the base station regarding the extent to which the transmission has been received by the intended recipients. For example, the base station may forward information regarding individual response signals to the MTC server, or may simply send a message to the MTC server to indicate whether or not all the intended recipient terminals received the multicast transmission. The MTC server may then decide on the appropriate course of action. For example, if the MTC server is informed by the base station that there is at least one MTC device which did not successfully receive the multicast transmission, the MTC server may decide to instigate a re-transmission immediately, or at a later stage, or determine that the transmission was non-critical and take no action.

In other examples the MTC server might not play a role in the feedback mechanism provided by the response signals and this might be managed solely by the telecommunications network, for example, within the respective base station(s). That is to say, the base station(s) may be configured to receive the response signals, determine which (if any) intended recipient devices within their area have not acknowledged successful reception of the multicast transmission (for example, because they have not responded or responded with a negative acknowledgement), and take action to re-transmit the data as appropriate. The base station(s) may determine different re-transmission strategies depending on the number of terminal devices they are serving which do not indicate successful reception. For example, if there are many failed receptions within a base station's cell, re-transmission by way of another multicast may be considered appropriate. However, if there are only one or a few failed receptions, a unicast transmission scheme for each individual terminal devices not reporting successful reception may be considered more appropriate.

Figure 18A:
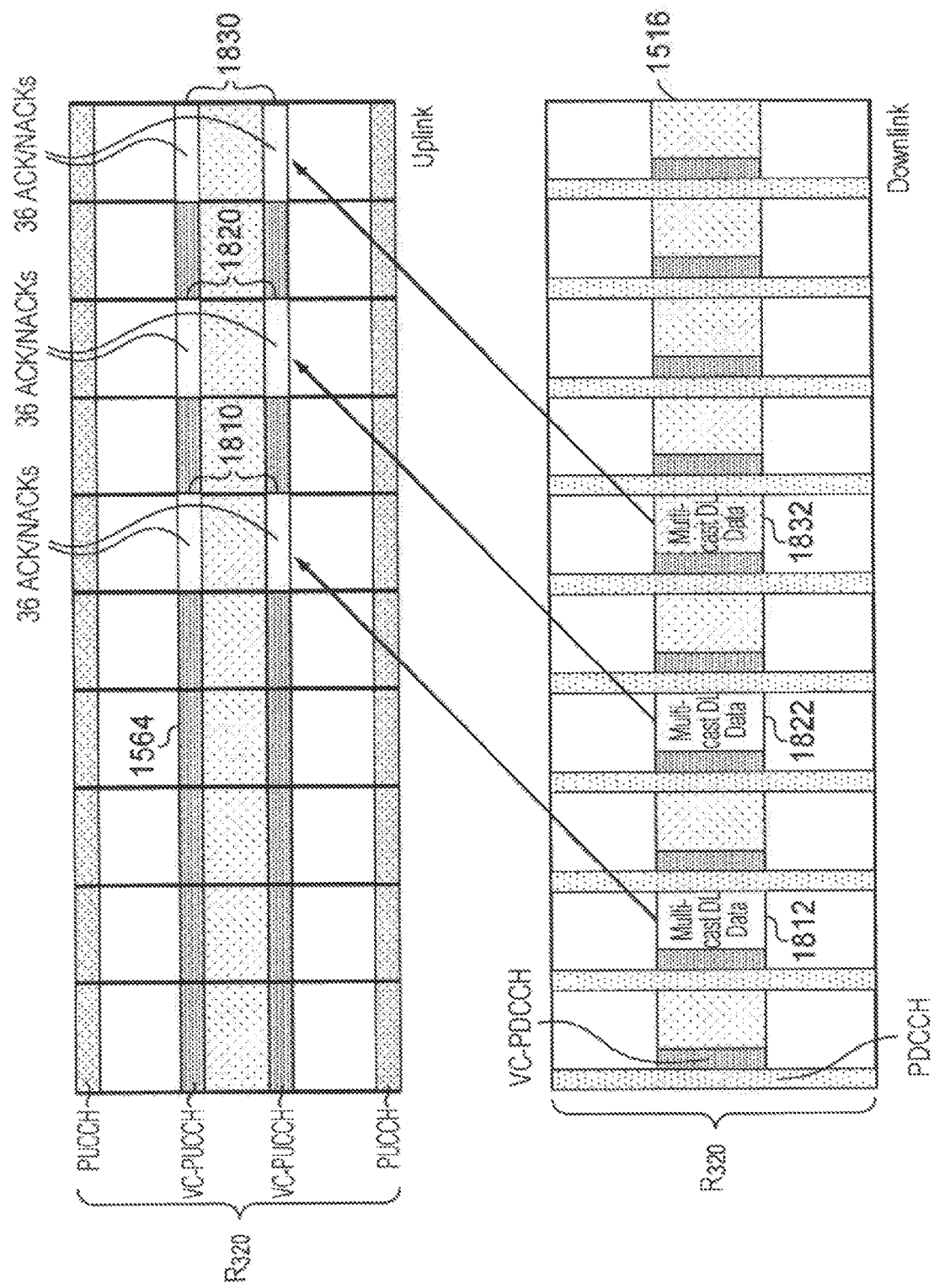
FIG. 18A schematically represents allocated resources for downlink multicast transmissions and associated uplink acknowledgement/non-acknowledgement signals according to various embodiment of the invention.

FIG. 18A schematically represents how the uplink and downlink transmissions resources represented in FIG. 15 might be used to provide for a HARQ procedure for a virtual carrier in a multicast context in accordance with an embodiment of the invention. The various elements of FIG. 18A will be understood from the above description of the corresponding elements in FIG. 15. Thus FIG. 18A schematically shows three multicast transmissions 1812, 1822, 1832 occurring on PDSCH in different sub-frames of the downlink radio frame represented in the figure. These multicast transmissions may be based on conventional techniques and identify the intended recipients by virtue of a multicast group ID in the normal way. The three different transmissions shown in FIG. 18A may be unrelated from one another (e.g. independent transmissions intended for different multicast groups), or may be related, e.g. s series of transmissions for the same multicast group. The specific nature of the information being transmitted is not significant to the underlying operating principles.

In accordance with embodiments of the invention, terminal devices which are members of a multicast group to which a transmission is made are configured to send an acknowledgement/negative acknowledgment (ACK/NACK) in response to the multicast transmission. The configuration of these multicast ACK/NACK response signals may follow the same general principles, e.g. in terms of signalling format and content, as for conventional ACK/NACK signalling associated with conventional unicast transmission schemes. Furthermore, and as with FIG. 17A, the multicast ACK/NACK responses sent in response to a multicast transmission in a virtual carrier context may be sent on a PUCCH 1564 associated with the virtual carrier. In accordance with existing LTE standards for ACK/NACK signalling in a unicast context, an ACK/NACK response signal is sent by a terminal device (user equipment—UE) in a sub-frame which is four sub-frames later than the sub-frame in which the corresponding downlink transmission is scheduled on PDSCH. Scheduling information (resource allocation) for downlink transmissions is carried on PDCCH, and for conventional unicast ACK/NACK signalling, the particular uplink transmission resource on PUCCH which is used for the ACK/NACK signalling is based on the PDCCH resources used to allocate the downlink transmission.

However, in a multicast context, different uplink transmission resources (e.g. in terms of times and/or frequencies and/or codes) may be used for ACK/NACK signalling from different terminal devices to allow the response signals to be distinguished at the base station. For example, based on the uplink sub-frame structure shown in FIG. 17B and the use of virtual carrier PUCCH for ACK/NACK signalling, 36 different terminal devices might be configured to use different ones of the 36 available PUCCH resources in a sub-frame which is four sub-frames later than the sub-frame in which the multicast data is transmitted. This is the approach schematically represented in FIG. 18A by the three PUCCH regions 1810, 1820, 1830 each containing (up to) 36 ACK/NACK signals in sub-frames which are four later than the respective corresponding multicast transmissions 1812, 1822, 1832. The different terminal devices may be allocated the specific resources to use for their respective ACK/NACK signalling during an initial set-up procedure. For example, the different terminal devices might be provided with information regarding the specific PUCCH resource to use within each sub-frame when being allocated a C-RNTI. In other examples, additional signalling associated with a multicast transmission may be used by the base station to allocate specific PUCCH resource for ACK/NACK response signals to each terminal device. Thus there are a number of ways in which the respective base station(s) can manage the different uplink resources to be used for ACK/NACK signalling by different terminal devices within the different multicast groups to allow received ACK/NACK responses to be mapped to corresponding terminal devices.

For a conventional ACK/NACK procedure in a unicast context the specific PUCCH resource to be used for the ACK/NACK response within the relevant sub-frame (e.g. four sub-frames later than the downlink transmission) can be derived by the terminal device in different ways. For example, with dynamic downlink scheduling the specific PUCHH resource to use when sending an ACK/NACK response is implicitly signalled by the allocation message on PDCCH for the PDSCH data transmission that is to be ACKed/NACKed. Alternatively, with semi-persistent scheduling there will not necessarily be corresponding PDCCH allocation data for the downlink transmissions, and in this case the specific PUCCH resource to use within the relevant sub-frame (e.g. four sub-frames later than the downlink) may be predefined as a part of the procedure for setting up the downlink transmission.

In a multicast context there are also a number of different ways in which the specific PUCCH resource to use by the respective terminal devices can be established.

For example, the eNodeB may provide an indication through additional signalling on PDCCH or PDSCH in association with the multicast downlink transmission from which the respective terminal devices can derive their own PUCHH resource. For example, the eNodeB may transmit information linking specific identifiers for the different terminal devices that are members of the multicast group within the sNodeB's footprint (e.g. radio-network temporary identifiers—RNTIs) with specific PUCCH uplink resources (or indeed any other uplink resources) to be used for ACK/NACK signalling by the corresponding terminal device. The various terminal devices can thus receive this information, identify their specific identifier from among the other members of the multicast group, and determine the appropriate uplink resource accordingly. The uplink resource indication may, for example, specify a particular resource within a sub-frame and a particular sub-frame to use, or may simply specify a particular resource within to be used in a default sub-frame, for example, a sub-frame that is four sub-frames later than a sub-frame in which the corresponding multicast transmission is made.

In other examples, the specific resource to be used by a given terminal device for ACK/NACK signalling may be established during a set up procedure. For example, when a terminal device that is a member of a multicast group for which ACK/NACK signalling is to be used in accordance with an embodiment of the invention first connects to the eNodeB, or when a multicast transmission first begins.

Figure 18B:
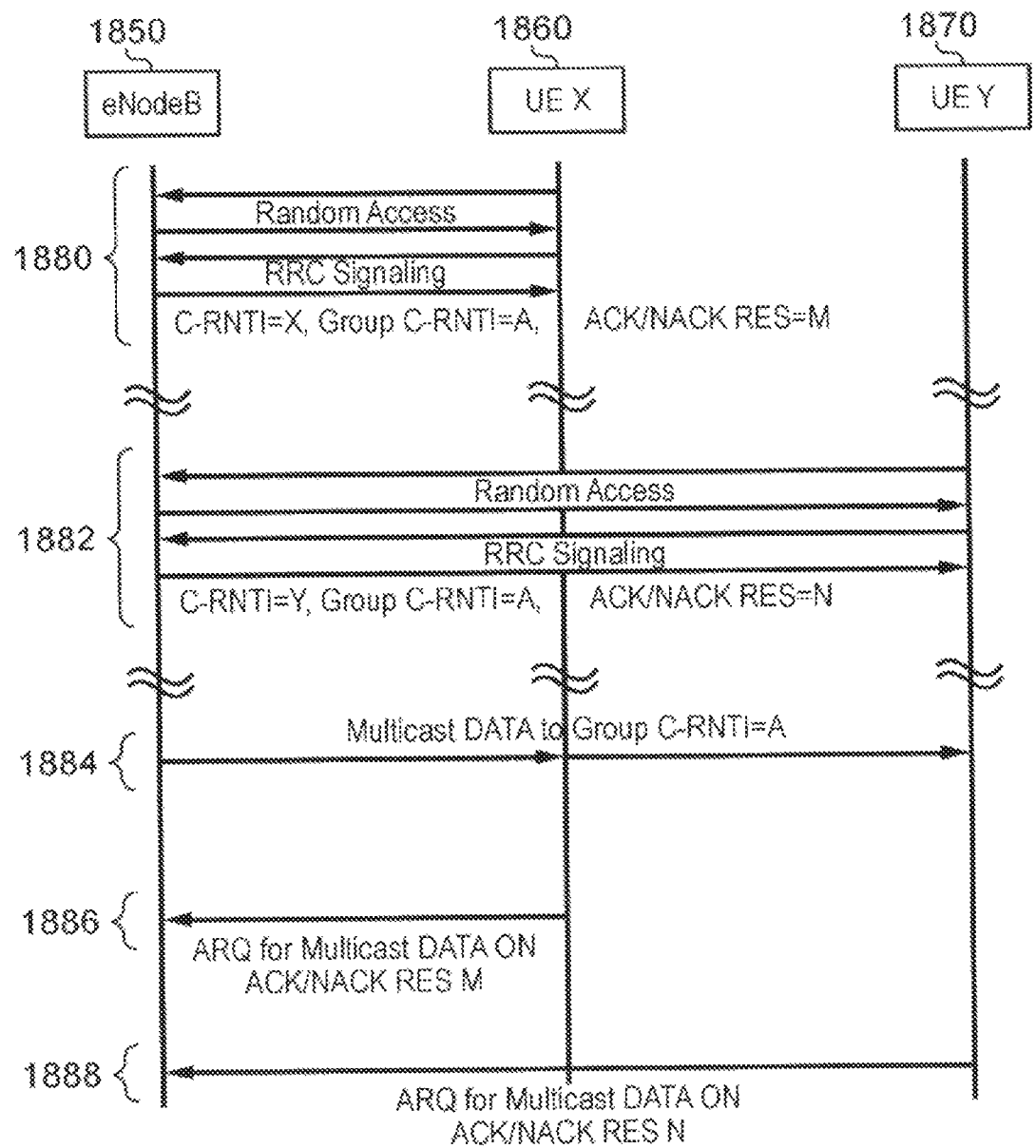
FIG. 18B is a ladder diagram schematically representing a signalling mechanism for causing different terminal devices to send uplink acknowledgement/non-acknowledgement signalling associated with downlink multicast transmissions using different transmission resources.

FIG. 18B is a signalling ladder diagram showing how a base station (eNodeB) 1850 may communicate ACK/NACK signalling resource information (i.e. information on which uplink resource to use for ACK/NACK signalling) to different terminal devices (UEs), such as UE X (identified by reference number 1860) and UE Y (identified by reference number 1870), which are both subscribers to the same multicast service "A".

In the example of FIG. 18B, the ACK/NACK signalling resource information is defined during an initial set up stage when terminal devices connect to the network. Thus, UE X, upon waking up, for example, sends a random access preamble to the eNodeB, in order to be recognized by the eNodeB. After a Random Access handshake procedure, RRC signalling is exchanged, and the terminal device 1860 (UE X) is allocated a C-RNTI (Cell Radio Network Temporary Identity) by the eNodeB. The C-RNTI is an address which is used to identify the UE in communications with the eNodeB. In the example of FIG. 18B it is assumed UE X is allocated a C-RNTI of "X". In this sequence, along with the UE-specific C-RNTI assignment, a Group C-RNTI associated with the multicast group is also communicated to the UE. In the example of FIG. 18B it is assumed the relevant multicast service is associated with a Group C-RNTI of "A". This process of allocating C-RNTIs may be generally performed in accordance with known techniques. However, in addition to allocating the two types of C-RNTI, the eNodeB also allocates UE X an ACK/NACK signalling resource to be used by the UE when determining the specific uplink resource for ACK/NACK signalling in response to multicast transmissions addressed to the multicast Group C-RNTI of "A". In the example of FIG. 18B it is assumed UE X is allocated an ACK/NACK signalling resource information "M", where "M" corresponds to (i.e. identifies) a specific PUCCH resource within sub-frames of the virtual carrier in which the scheme is implemented.

The set-up signalling associated with allocating UE X with C-RNTI "X", Group C-RNTI "A", and ACK/NACK signalling resource information "M", is schematically represented in FIG. 18B by reference numeral 1880.

Similar set-up signalling (schematically represented in FIG. 18B by reference numeral 1882) is provided for the terminal device 1870 (UE Y). Thus, UE Y, upon waking up, for example, sends a random access preamble to the eNodeB, in order to be recognized by the eNodeB. After a Random Access handshake procedure, RRC signalling is exchanged, and the terminal device 1870 (UE Y) is allocated a C-RNTI by the eNodeB. The C-RNTI is an address which is used to identify the UE Y in communication with the eNodeB. In the example of FIG. 18B it is assumed UE Y is allocated a C-RNTI of "Y". In this sequence, along with the UE-specific C-RNTI assignment, a Group C-RNTI associated with the multicast group is also communicated to the UE. In the example of FIG. 18B the relevant multicast service is associated with a Group C-RNTI of "A". As for UE X, in addition to allocating the two types of C-RNTI for UE Y, the eNodeB also allocates UE Y an ACK/NACK signalling resource to be used by UE Y when determining the specific uplink resource for ACK/NACK signalling in response to multicast transmissions addressed to the multicast Group C-RNTI of "A". In the example of FIG. 18B it is assumed UE Y is allocated an ACK/NACK signalling resource information "N", where "N" identifies a specific PUCCH resource within sub-frames of the virtual carrier which is different from that indicated by ACK/NACK signalling resource information "M" for UE X.

Subsequently a downlink multicast transmission 1884 addressed to a multicast group ID corresponding to Group C-RNTI="A" is made. This may be instigated by a remote MTC server associated with the terminal devices UE X and UE Y and promulgated through the network to the eNodeB 1850 for transmission in the normal way.

The terminal devices UE X and UE Y are aware the multicast transmission is intended for them based on the Group C-RNTI="A" in the normal way. Thus each terminal device seeks to receive and process the transmission, and in accordance with the above-described principles of embodiments of the invention, the terminal devices addressed by the multicast transmission are configured to send an uplink ACK/NACK signal in response. As schematically represented in FIG. 18A, it is assumed in this example the terminal devices are configured to respond with appropriate ACK/NACK signalling in a sub-frame which is four sub-frames later than that containing the multicast transmission 1884 (i.e. following the same general timing as for unicast ACK/NACK signalling). Furthermore, the different UEs 1860, 1870 are configured to use different PUCCH resources for their respective ACK/NACK signalling according to the respective ACK/NACK signalling resource indications they received during set up. Thus in this example, UE X 1860 sends an ACK/NACK response in the relevant sub-frame on a PUCCH resource identified by ACK/NACK signalling resource indication "M" (schematically indicted in FIG. 18B by signalling 1886), and UE Y 1870 sends an ACK/NACK response in the relevant sub-frame on a PUCCH resource identified by ACK/NACK signalling resource indication "N" (schematically indicted in FIG. 18B by signalling 1888). The specific format for the ACK/NACK response signals 1886, 1888 is not significant and can be arranged in accordance with any desired scheme, for example it may simply follow the same general principles as for established ACK/NACK response signalling associated with unicast transmissions.

Thus FIG. 18B shows one example scheme by which an eNodeB 1600, 1850 can allocate different PUCCH resources to different terminal devices subscribing to a given multicast service to manage the different uplink resources used by the different terminal devices for ACK/NACK response signalling. Alternate schemes may be used in other examples. For example, in some cases ACK/NACK signalling resource indications may not be explicitly communicated to different terminal device during a set-up procedure, but may be communicated implicitly instead, for example within the specific C-RNTI allocated by the eNodeB. For example, an eNodeB might in effect reserve a series of C-RNTI values to be allocated to terminal devices within a given multicast group whereby a characteristic of the C-RNTI may be used to indicate which uplink resource should be used by the respective terminal devices. For example, an eNodeB may allocate C-RNTI values from a series for which some of the digits, for example the last few bits, correspond to a different number for each terminal device, and based on which each terminal device derives an appropriate uplink PUCCH resource for ACK/NACK signalling. In principle, different terminal devices within a given multicast group could each be configured to use particular uplink resources without network signalling, for example, the information could be in effect be hardwired in the terminal device, for example during manufacture or deployment. This approach is perhaps less flexible, but may nonetheless be appropriate in some cases, for example, where it is know there will be little or changes to the multicast group members for an extended time.

In some cases there may be fewer than 36 PUCCH resources available in a given sub-frame (e.g. because of poor channel conditions), and even if there are 36 PUCCH resources available for ACK/NACK signalling, there might be more than 36 terminal devices receiving the multicast transmission. In cases such as this where there may be more ACK/NACK response signals than available PUCCH resources per sub-frame, the system may be configured to use additional resources, for example, PUCCH resources in additional sub-frames, PUCCH resources on additional virtual carriers, or other resources elsewhere in the uplink frequency resource grid (for example, on a virtual carrier's PUSCH).

In this regard the terminal devices of a multicast group might be notionally separated into sub-groups with each sub-group containing a number of terminal devices for which ACK/NACK signalling can be accommodated on PUCCH in a single sub-frame. For example, assuming there are 36 PUCCH resources available in each sub-frame, and there are, say, 60 terminal devices in a given multicast group, 36 of the devices might be allocated to a first sub-group (Sub-group I) while the remaining 24 terminal device might be allocated to a second sub-group (Sub-group II). Of course if the there are still more terminal devices in a multicast group, there may be more notional sub-groups defined. The resources to be used by the different terminal devices for ACK/NACK response signalling may then be configured differently for the different sub-groups. For example, the different sub-groups may be configured to respond in different sub-frames or on different virtual carriers.

Figure 19:
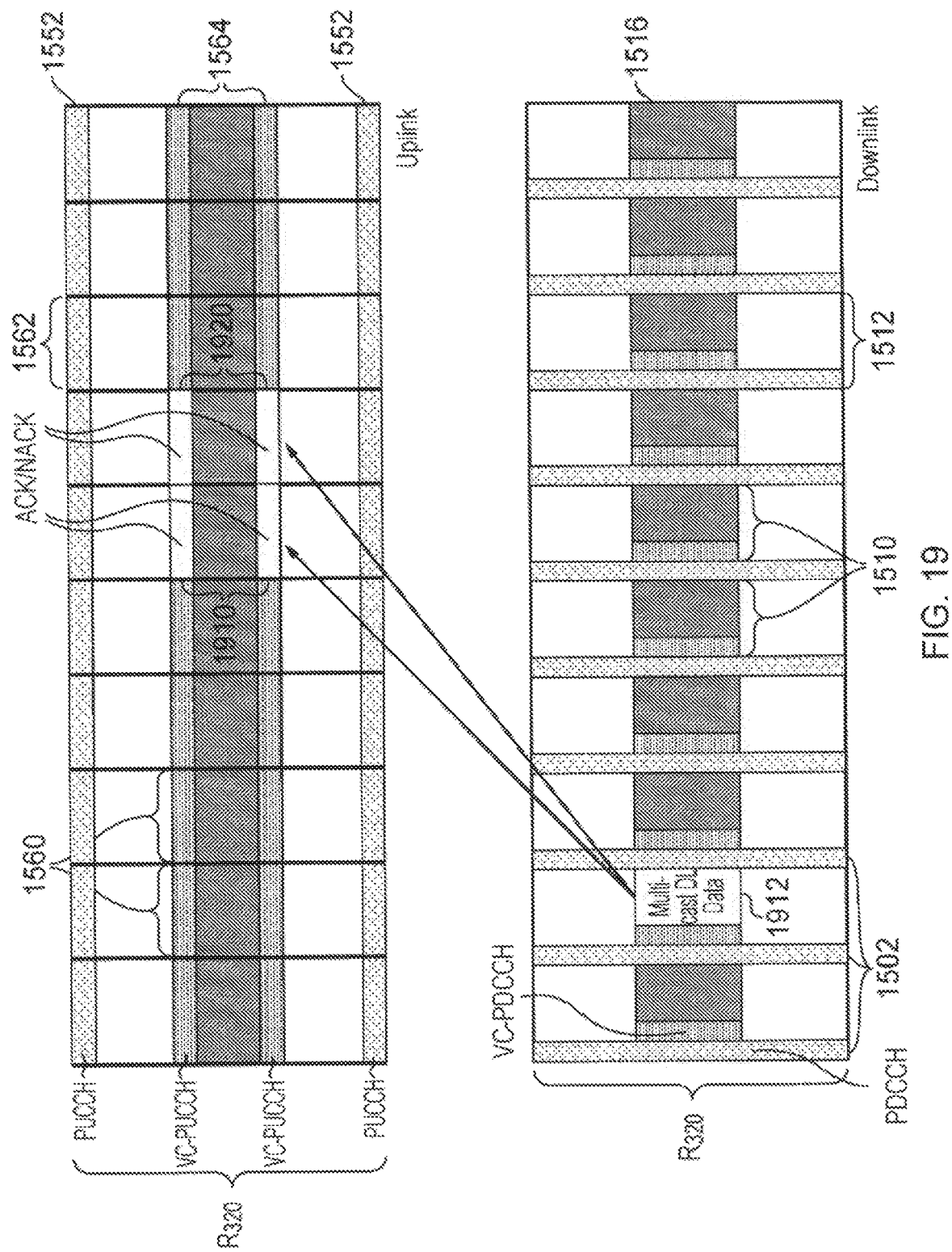
FIGS. 19 and 20 schematically represent allocated resources for downlink multicast transmissions and associated uplink acknowledgement/non-acknowledgement signalling according to different embodiment of the invention.

FIG. 19 schematically represents how uplink and downlink transmission resources might be used to provide for a HARQ procedure for a virtual carrier in a multicast context in accordance with an embodiment of the invention when there are more recipient terminal devices than there are available PUCCH resources for ACK/NACK responses in each sub-frame of a virtual carrier. Various elements of FIG. 19 will be understood from the description of corresponding elements in FIGS. 15 and 18. In the example shown here it is assumed PUCCH is able to support 36 ACK/NACK response signals from separate terminal devices in each sub-frame, but there are somewhere between 37 and 72 terminal devices receiving the multicast transmission. Thus the terminal devices are notionally divided in to two sub-groups such as described above. The sub-groups may be referred to here as Sub-group I and Sub-group II, and in this example it is assumed the terminal devices are aware of which sub-group they are in. There are various ways of communicating the relevant sub-group information (information indicative of the relevant notional sub-group) to the different terminal devices, as described further below.

In accordance with the scheme shown in FIG. 19 terminal devices in different sub-groups are operable to send ACK/NACK response signals in different sub-frames. This allows the base station to receive more responses than can be accommodated within a single sub-frame. Thus in this particular example, in response to a multicast transmission 1912, Sub-group I terminal devices are configured to send their ACK/NACK signals four sub-frames later using PUCCH resources 1910 and Sub-group II terminal devices are configured to send their ACK/NACK signals five sub-frames later using PUCCH resources 1920. Thus a base station is able to in effect group terminal devices which are members of a given multicast group into sub-groups for the purpose of assigning uplink resources to be used by the terminal devices for ACK/NACK signalling.

Figure 20:
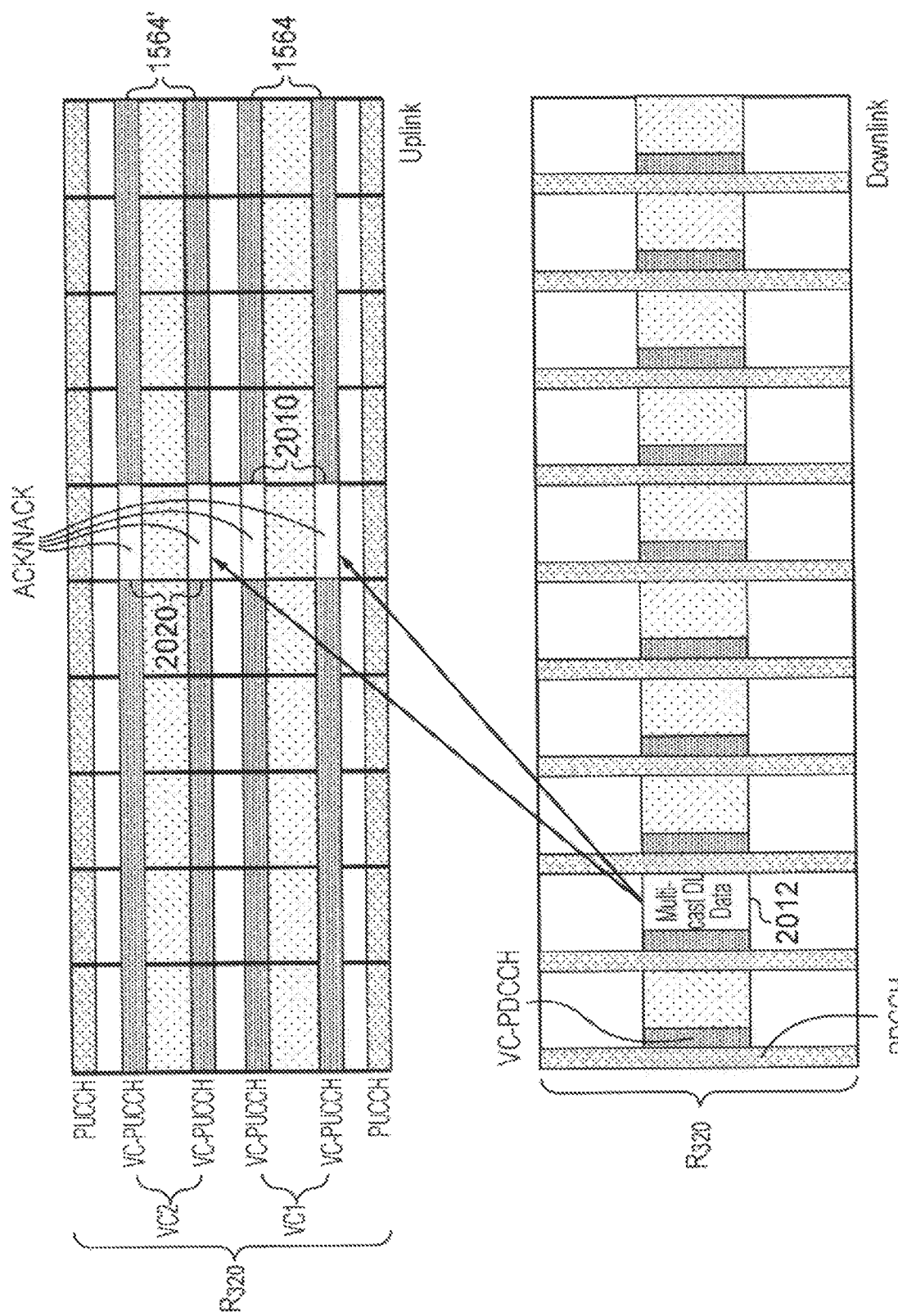

FIG. 20 schematically represents how uplink and downlink transmission resources might be used to provide for a HARQ procedure for a virtual carrier in a multicast context in accordance with another embodiment of the invention when there are more recipient terminal devices than there are available PUCCH resources for ACK/NACK responses in each sub-frame of a virtual carrier. Various elements of FIG. 20 will be understood from the description of corresponding elements in FIGS. 15 and 18. However, whereas in FIGS. 15 and 18 a single virtual carrier is provided within a host carrier bandwidth, in the example of FIG. 20 there are two separate virtual carriers (VC1 & VC2) defined for the purposes of resource allocation. The two virtual carriers may be configured in the same way as one another, and each one may in turn be defined in the same was as any of the single virtual carrier examples described above, with the only difference being the different operating frequencies allocated to each virtual carrier (i.e. the specific OFDM sub-carriers).

In the example shown here it is assumed that each PUCCH (1564, 1564') is able to support 36 ACK/NACK response signals from separate terminal devices in each sub-frame, but there are again somewhere between 37 and 72 terminal devices receiving a multicast transmission on the first virtual carrier VC1. As before, the terminal devices are notionally divided in to two sub-groups, which may again be referred to here as Sub-group I and Sub-group II.

In accordance with the scheme shown in FIG. 20 terminal devices in different sub-groups are operable to send ACK/NACK response signals in the same sub-frames, but using different virtual carriers. This allows the base station to receive more responses than can be accommodated within a single sub-frame of a single virtual carrier. Thus in this particular example, in response to a multicast transmission 2012, Sub-group I terminal devices are configured to send their ACK/NACK signals four sub-frames later using PUCCH resources 2010 on virtual carrier VC1 while Sub-group II terminal devices are configured to send their ACK/NACK signals in the corresponding sub-frame using PUCCH resources 2020 on virtual carrier VC2. This provides another mechanism whereby a base station is able to group terminal devices which are members of a multicast group into sub-groups for the purpose of assigning different uplink resources to be used by the terminal devices for ACK/NACK signalling.

Figure 21:
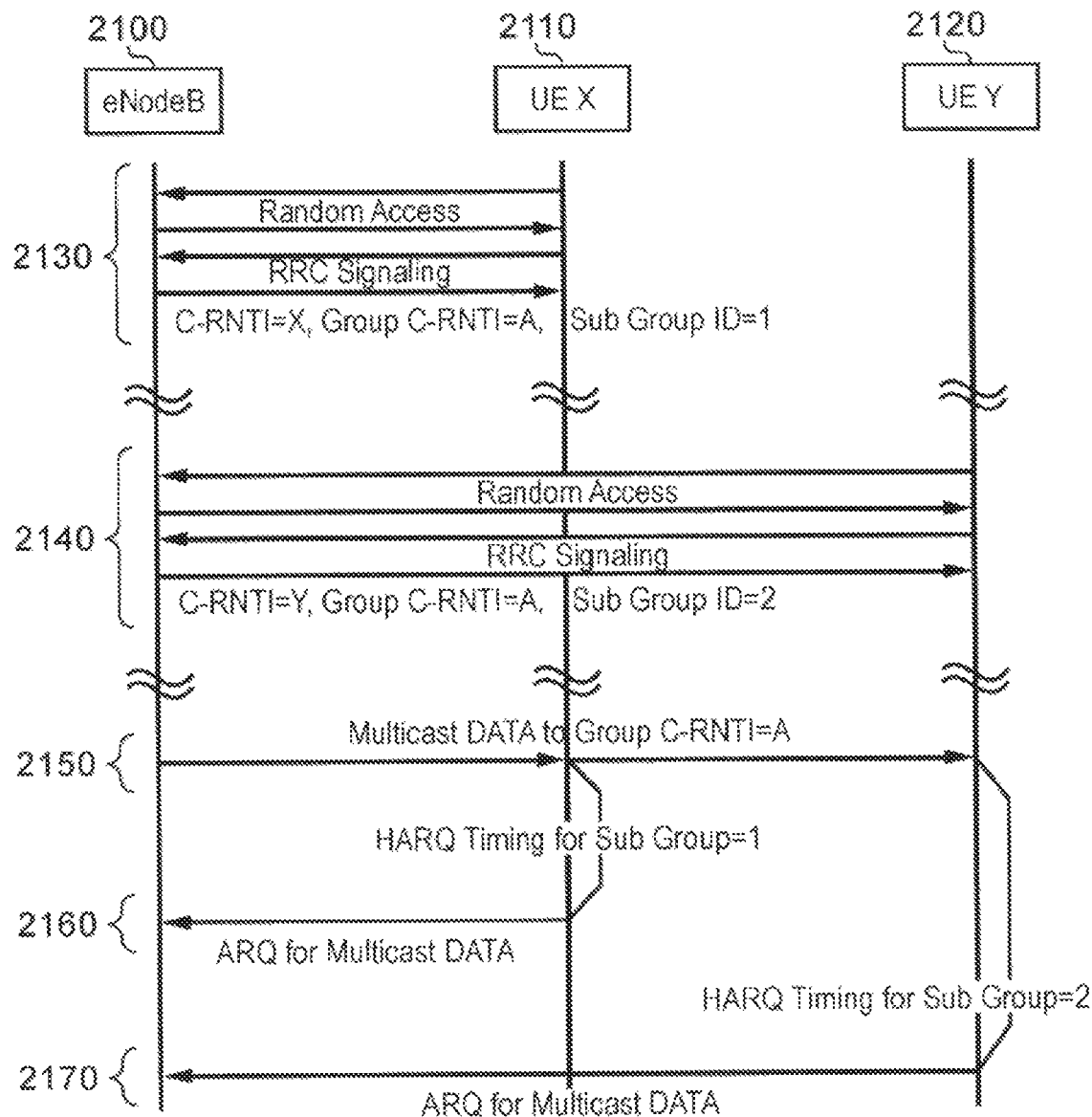
FIGS. 21 and 22 are ladder diagrams schematically representing mechanisms for causing different terminal devices to send uplink acknowledgement/non-acknowledgement signalling associated with downlink multicast transmissions using different transmission resources.

FIG. 21 is a signalling ladder diagram showing how a base station (eNodeB) 2100 might communicate sub-grouping information to different terminal devices (UEs), such as UE X (identified by reference number 2110) and UE Y (identified by reference number 2120) which are both subscribers to the same multicast service "A".

In the example of FIG. 21, the sub-groups are defined during an initial set up stage when terminal devices connect to the network. Thus, UE X, upon waking up, for example, sends a random access preamble to the eNodeB, in order to be recognized by the eNodeB. After a Random Access handshake procedure, RRC signalling is exchanged, and the terminal device 2110 (UE X) is allocated a C-RNTI (Cell Radio Network Temporary Identity) by the eNodeB. The C-RNTI is an address which is used to identify the UE in communication with the eNodeB. In the example of FIG. 21 it is assumed UE X is allocated a C-RNTI of "X". In this sequence, along with the UE-specific C-RNTI assignment, a Group C-RNTI associated with the multicast group is also communicated to the UE. In the example of FIG. 21 it is assumed the relevant multicast service is associated with a Group C-RNTI of "A". This process of allocating C-RNTIs may be generally performed in accordance with known techniques. However, in addition to allocating the two types of C-RNTI, the eNodeB also allocates UE X a multicast subgroup ID to be used by the UE when determining the resources for ACK/NACK signalling in response to multicast transmissions addressed to the multicast Group C-RNTI of "A". In the example of FIG. 21 it is assumed UE X is allocated to multicast subgroup ID "I".

It will be appreciated in some examples UE X may also be provided with an indication at this stage as to which PUCCH resource in a given sub-frame the UE should use for ACK/NACK signalling, such as shown in FIG. 18B. However, this is not represented in FIG. 21 (or in FIG. 22 below) for simplicity.

The set-up signalling associated with allocating UE X with C-RNTI "X", Group C-RNTI "A", and subgroup ID "I", is schematically represented in FIG. 21 by reference numeral 2130.

Similar set-up signalling (schematically represented in FIG. 21 by reference numeral 2140) is provided for the terminal device 2120 (UE Y). Thus, UE Y, upon waking up, for example, sends a random access preamble to the eNodeB, in order to be recognized by the eNodeB. After a Random Access handshake procedure, RRC signalling is exchanged, and the terminal device 2120 (UE Y) is allocated a C-RNTI by the eNodeB. The C-RNTI is an address which is used to identify the UE Y in communication with the eNodeB. In the example of FIG. 21 it is assumed UE Y is allocated a C-RNTI of "Y". In this sequence, along with the UE-specific C-RNTI assignment, a Group C-RNTI associated with the multicast group is also communicated to the UE. In the example of FIG. 21 the relevant multicast service is associated with a Group C-RNTI of "A". In addition to allocating the two types of C-RNTI, the eNodeB also allocates UE Y a multicast subgroup ID to be used by the UE when determining the resources for ACK/NACK signalling in response to multicast transmissions addressed to the multicast Group C-RNTI of "A". In the example of FIG. 21 it is assumed UE Y is allocated to multicast subgroup ID "II".

Subsequently a downlink multicast transmission 2150 addressed to a multicast group ID corresponding to Group C-RNTI="A" is made. This may be instigated by a remote MTC server associated with the terminal devices UE X and UE Y and promulgated through the network to the eNodeB 2100 for transmission in the normal way.

The terminal devices UE X and UE Y are aware the multicast transmission is intended for them based on the Group C-RNTI="A" in the normal way. Thus each terminal device seeks to receive and process the transmission, and in accordance with the above-described principles of embodiments of the invention, the terminal devices addressed by the multicast transmission are configured to send an uplink ACK/NACK signal in response. In this example, it is assumed the terminal devices are configured such that if they are associated with a multicast subgroup ID "I", they send their ACK/NACK response after a first time has elapsed (schematically indicted in FIG. 21 by signalling 2160), and if they are associated with a multicast subgroup ID "II", they send their ACK/NACK response after a second time, which is different from the first time, has elapsed (schematically indicted in FIG. 21 by signalling 2170). For example, the HARQ timing for terminal devices which have been allocated by the eNodeB to multicast subgroup ID "I" might be such that the terminal device UE X responds with ACK/NACK signalling in a sub-frame which is four sub-frames later than the downlink multicast transmission (e.g. such as identified by reference numeral 1910 in FIG. 19). The HARQ timing for terminal devices which have been allocated by the eNodeB to multicast subgroup ID "II" might then be such that the terminal device UE Y responds with ACK/NACK signalling in a sub-frame which is five sub-frames later than the downlink multicast transmission (e.g. such as identified by reference numeral 1920 in FIG. 19).

As explained above with reference to FIG. 20, in some implementations different sub-groups might be associated with ACK/NACK response signalling on different carriers instead of (or in addition to) ACK/NACK signalling in different sub-frames as in FIG. 19. For example, the HARQ response for terminal devices which have been allocated by the eNodeB to multicast subgroup ID "I" might be such that the terminal device responds with ACK/NACK signalling on a first virtual carrier in a sub-frame which is four sub-frames later than the downlink multicast transmission (e.g. such as identified by reference numeral 2010 in FIG. 20). Terminal devices which have been allocated by the eNodeB to multicast subgroup ID "II" might then be configured such that the terminal device responds with ACK/NACK signalling on a second virtual carrier in a sub-frame which is four sub-frames later than the downlink multicast transmission (e.g. such as identified by reference numeral 2020 in FIG. 20).

Thus FIG. 21 shows one example scheme by which an eNodeB 1600 can allocate different terminal devices subscribing to a given multicast service to different sub-groups to manage the uplink resources used by different terminal devices for ACK/NACK response signalling.

Figure 22:
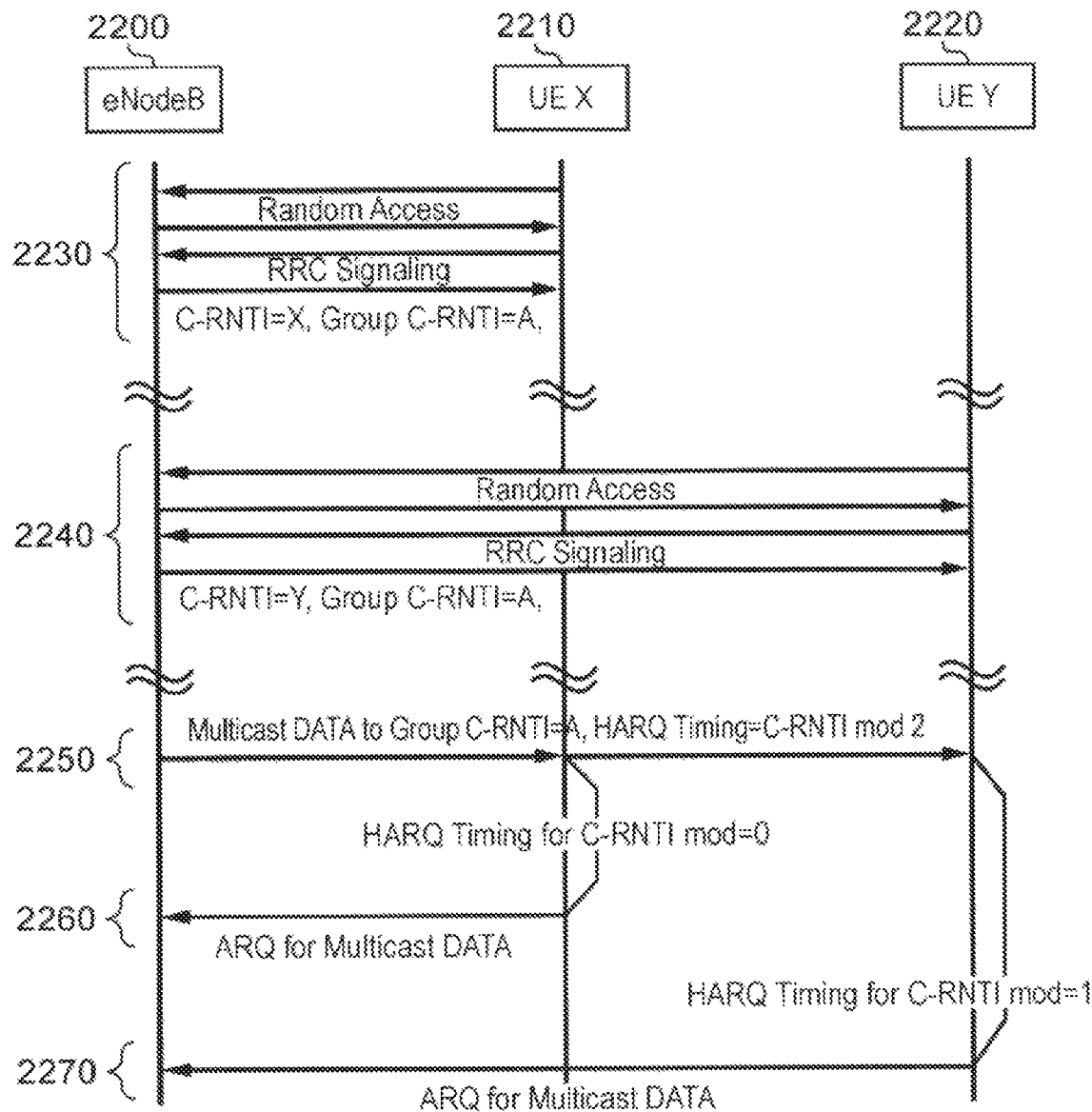

FIG. 22 is a signalling ladder diagram showing how a base station (eNodeB) 2200 might communicate sub-grouping information to different terminal devices (UEs), such as UE X (identified by reference number 2210) and UE Y (identified by reference number 2220) which are both subscribers to the same multicast service "A" according to another embodiment of the invention. This differs from the scheme of FIG. 21 in that sub-group information is not communicated to terminal devices during set up.

Thus, UE X 2210, upon waking up, for example, obtains a C-RNTI and multicast Group C-RNTI from the eNodeB 2200 in the same general manner as in FIG. 21 and in accordance with established techniques. As with FIG. 21, in the example of FIG. 22 it is assumed UE X is allocated a C-RNTI of "X" and is provided with a multicast Group C-RNTI of "A". The set-up signalling associated with allocating UE X with C-RNTI "X" and Group C-RNTI "A" is schematically represented in FIG. 22 by reference numeral 2230.

Similar set-up signalling (schematically represented in FIG. 22 by reference numeral 2240) is provided for the terminal device 2220 (UE Y). Thus, UE Y, upon waking up, obtains a C-RNTI "Y" and a multicast Group C-RNTI "A" from the eNodeB 2200.

Subsequently a downlink multicast transmission 2250 addressed to a multicast group ID corresponding to Group C-RNTI="A" is made. This may be instigated by a remote MTC server associated with the terminal devices UE X and UE Y and promulgated through the network to the eNodeB 2100 for transmission in the normal way. In accordance with this example embodiment the present invention the eNodeB 2200 is configured to determine how many sub-groups are needed to ensure the total number of ACK/NACK responses expected from terminal devices subscribed to multicast service "A" within the eNodeB's cell range can be accommodated. For example, if up to 36 ACK/NACK responses can be accommodated in a single sub-frame, and there are N terminal devices subscribed to multicast service "A" within the eNodeB's cell range, it may be appropriate to divide the N terminal devices into n subgroups, where n=CEILING(N/36).

The eNodeB may then be configured to communicate the value n in association with the downlink multicast transmission 2250 (e.g. in an additional PDCCH field). Terminal devices may then determine an appropriate resource for their ACK/NACK response based on n and their C-RNTI. For example, individual terminal devices may determine their own sub-group ID by determining the value of (C-RNTI mod n). Assuming the C-RNTI values allocated by eNodeB to the various UEs are suitably distributed, this process will ensure the terminal devices will in effect self-organise into an appropriate number of subgroups. If the C-RNTI values are not uniformly distributed (e.g. if there are more even-numbered C-RNTI values allocated to subscribers of multicast service than odd-numbered C-RNTI values), the eNodeB can take account of this and increase n accordingly— that is to say, the eNodeB can "over segment" the group to ensure no sub-group has more than 36 members. Because the eNodeB knows exactly what C-RNTIs have been allocated, it can determine how large n should be to ensure there are no subgroups with more members than desired.

In the example of FIG. 22, it is assumed there are only two sub-groups required to manage the available resources for ACK/NACK signalling, thus each terminal device determines a HARQ timing based on the value of (C-RNTI mod 2).

The terminal devices UE X and UE Y are aware the multicast transmission 2250 is intended for them based on the Group C-RNTI="A" in the normal way. The UEs 2210, 2220 also determine their sub-group ID from the value of n signalled by the eNodeB 2200 (in this example n=2). Here it assumed C-RNTI "X" mod 2=0, which is taken as corresponding to a multicast subgroup ID "I", and C-RNTI "Y" mod 2=1, which is taken as corresponding to a multicast subgroup ID "II".

Each terminal device seeks to receive and process the transmission, and in accordance with the above-described principles of embodiments of the invention, the terminal devices addressed by the multicast transmission are configured to send an uplink ACK/NACK signal in response. In this example, it is assumed the terminal devices are configured such that if they are associated with a multicast subgroup ID "I", they send their ACK/NACK response after a first time has elapsed (schematically indicted in FIG. 22 by signalling 2260), and if they are associated with a multicast subgroup ID "II", they send their ACK/NACK response after a second time, which is different from the first time, has elapsed (schematically indicted in FIG. 22 by signalling 2270). For example, the HARQ timing for terminal devices in multicast subgroup ID "I" might be such that the terminal device UE X responds with ACK/NACK signalling in a sub-frame which is four sub-frames later than the downlink multicast transmission (e.g. such as identified by reference numeral 1910 in FIG. 19). The HARQ timing for terminal devices in multicast subgroup ID "II" might then be such that the terminal device UE Y responds with ACK/NACK signalling in a sub-frame which is five sub-frames later than the downlink multicast transmission (e.g. such as identified by reference numeral 1920 in FIG. 19).

Again as explained above with reference to FIG. 20, in some implementations different sub-groups might be associated with ACK/NACK response signalling on different carriers instead of (or in addition to) ACK/NACK signalling in different sub-frames as in FIG. 19.

In another example for handling more ACK/NACK responses than can accommodated in a single sub-frame, the multicast group itself may in effect be split into several smaller multicast groups having different multicast group IDs and each containing a number of terminal devices that can send an ACK/NACK response in the same sub-frame. A multicast transmission intended for all the terminal devices in the multicast group may then be transmitted as separate multicast transmissions separately for each of the sub-groups using the corresponding multicast IDs. Terminal devices within each sub-group can then respond in the manner described above with reference to FIG. 18A to the multicast transmission addressed to their multicast (sub-) group ID. This has the advantage of allowing all ACK/NACK responses to be received in a given sub-frame following a multicast transmission, but relies on multiple transmissions of multicast data (because it is repeated for each multicast sub-group).

It will be further be appreciated that the principles described above in relation to FIGS. 19 to 22 regarding mechanisms for managing ACK/NACK response signalling in more than one sub-frame of one virtual carrier may be combined with any of the principles described above for managing ACK/NACK response signalling within any given sub-frame, for example as described with reference to FIG. 18B. Thus a base station (eNodeB) is able to manage which uplink resource are to be used by different terminal devices (UEs) which are members of a given multicast group based on two parameters, namely an indication of which resource to use with the sub-frame structure, and an indication of which sub-frame to use. This two-parameter addressing mechanism can be an efficient way to provide an indication of different uplink resources for potentially many different terminal devices. However, it will be appreciated other schemes for indicating which uplink resource to use may be provided. For example, if there are one hundred terminal devices (e.g. vending machines) within a base station's cell footprint subscribing to a given multicast service, an eNodeB may simply allocate them with one hundred consecutive C-RNTIs. Each terminal device may then derive an appropriate uplink resource to use for ACK/NACK signalling based on its C-RNTI. For example, with a carrier that can accommodate n ACK/NACK responses per sub-frame, a terminal device with C-RNTI "Z" might be configured to respond to a multicast transmission in sub-frame i in a sub-frame i+4+FLOOR(Z/n), using a resource within the sub-frame based on the fraction part of Z/n.

It will be appreciated that various modifications can be made to the embodiments described above without departing from the scope of the present invention as defined in the appended claims.

For example, while the above description has focussed on an implementation of the invention in a virtual carrier context, it will be appreciated that other example embodiments of the invention may be implemented in otherwise conventional telecommunication systems, for example, which might not support a virtual carrier of the kind described above.

Furthermore, although embodiments of the invention have been described with reference to an LTE mobile radio network, it will be appreciated that the present invention can be applied to other forms of network such as GSM, 3G/UMTS, CDMA2000, etc. The term MTC terminal as used herein can be replaced with user equipment (UE), mobile communications device, terminal device etc. Furthermore, although the term base station has been used interchangeably with eNodeB it should be understood that there is no difference in functionality between these network entities.

Thus, there has been described a method of communicating data between a base station and a plurality of terminal devices in a wireless telecommunications system is described. The method comprises transmitting data from the base station to the plurality of terminal devices in a multicast transmission and transmitting response signals from the terminal devices to the base station to indicate whether or not the respective terminal devices have successfully received the multicast transmission. The use of a multicast transmission provides an efficient mechanism for communicating the same data to a plurality of terminal device, for example as might be desired in a machine-type communication network. In combination with this, the use of individual response signals, such as ACK/NACK signalling, from the terminal devices allows the base station, or other entity, such as a machine-type communications server, to track which terminal devices have indicated successful receipt of the multicast transmission, and to instigate an appropriate re-transmission protocol accordingly.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] ETSI TS 122 368 V10.530 (2011-07)/3GPP TS 22.368 version 10.5.0 Release 10)
[2] UK patent application GB 1101970.0
[3] UK patent application GB 1101981.7
[4] UK patent application GB 1101966.8
[5] UK patent application GB 1101983.3
[6] UK patent application GB 1101853.8
[7] UK patent application GB 1101982.5
[8] UK patent application GB 1101980.9
[9] UK patent application GB 1101972.6
[10] ETSI TS 136 213 V10.2.0 (2011-06)/3GPP TS 36.213 version 10.2.0 Release 10)
[11] ETSI TS 136 321 V10.2.0 (2011-06)/3GPP TS 36.321 version 10.2.0 Release 10)

The invention claimed is:

1. A terminal device for receiving data in a wireless telecommunications system, the terminal device including: circuitry configured to
receive data transmitted to a plurality of terminal devices in a multicast transmission; and
transmit a response signal in response to the multicast transmission to indicate whether the terminal device successfully received the multicast transmission, wherein
at least one of the receiving data and the transmitting the response signal is performed via a narrow-band carrier having a bandwidth less than a bandwidth of a conventional carrier carrying the narrow-band carrier,
the narrow-band carrier is a continuous band within the conventional carrier, and
the narrow-band carrier is treatable as logically distinct from data transmitted in parts of the conventional carrier other than in the narrow-band carrier, such that data transmitted on the narrow-band carrier is decodable without decoding all control data of the conventional carrier.

2. The terminal device of claim 1, wherein
the terminal device is configured to obtain an indication of an uplink transmission resource to be used for the response signal.

3. The terminal device of claim 2, wherein
the terminal device is configured to obtain the indication of an uplink transmission resource from information conveyed during a set-up procedure performed when the terminal device connects to the wireless telecommunications system.

4. The terminal device of claim 3, wherein
the set-up procedure comprises a Radio Resource Connection request.

5. The terminal device of claim 2, wherein
the terminal device is configured to obtain the indication of an uplink transmission resource from information conveyed in association with the multicast transmission.

6. The terminal device of claim 2, wherein
the terminal device is configured obtain the indication of an uplink transmission resource from information conveyed by explicit signalling.

7. The terminal device of claim 2, wherein
the terminal device is configured obtain the indication of an uplink transmission resource from information conveyed by implicit signalling.

8. The terminal device of claim 7, wherein
the terminal device is configured to obtain the indication of an uplink transmission resource from information conveyed within a radio network identifier allocated to the respective terminal devices.

9. The terminal device of claim 2, wherein
the indication of an uplink transmission resource comprises at least one of an indication of a transmission resource within an uplink sub-frame, an indication of an uplink sub-frame, and an indication of an uplink carrier.

10. The terminal device of claim 1, wherein
the terminal device is configured to transmit the response signal on a Physical Uplink Control Channel (PUCCH).

11. The terminal device of claim 1, wherein
the terminal device is configured to transmit the response signal in an uplink sub-frame of the wireless telecommunications system occurring at a time derived from the time of a downlink sub-frame containing the multicast transmission.

12. The terminal device of claim 1, wherein
the terminal device is configured to transmit the response signal in a different uplink sub-frames and/or carrier of the wireless telecommunications system as compared to a corresponding response signal from another terminal device.

13. The terminal device of claim 1, wherein
the terminal device is operable to receive a re-transmission of the data in the event the terminal device transmits a response signal indicating the multicast transmission was not successfully received.

14. The terminal device of claim 1, wherein
the terminal device is configured to transmit the response signal using uplink transmission resources which are specific to the terminal device for the multicast transmission.

15. The terminal device of claim 1, wherein
the wireless telecommunications system operates in downlink over a first frequency bandwidth and in uplink over a second frequency bandwidth,
the terminal device is configured to receive the multicast transmission using downlink transmission resources on frequencies selected from within a third frequency bandwidth which is smaller than and within the first frequency bandwidth, and
the terminal device is configured to transmit the response signal using uplink transmission resources on frequencies selected from within a fourth frequency bandwidth which is smaller than and within the second frequency bandwidth.

16. The terminal device of claim 15, wherein
the first and second frequency bandwidths are the same width and/or the third and fourth frequency bandwidths are the same width.

17. A method performed by a terminal device for receiving data in a wireless telecommunications system, the method comprising:
receiving data transmitted to a plurality of terminal devices in a multicast transmission; and
transmitting a response signal in response to the multicast transmission to indicate whether the terminal device successfully received the multicast transmission, wherein
at least one of the receiving data and the transmitting the response signal is performed via a narrow-band carrier having a bandwidth less than a bandwidth of a conventional carrier carrying the narrow-band carrier,
the narrow-band carrier is a continuous band within the conventional carrier, and
the narrow-band carrier is treatable as logically distinct from data transmitted in parts of the conventional carrier other than in the narrow-band carrier, such that data transmitted on the narrow-band carrier is decodable without decoding all control data of the conventional carrier.

18. A terminal device for receiving data in a wireless telecommunications system, the terminal device including:
means for receiving data transmitted to a plurality of terminal devices in a multicast transmission; and
means for transmitting a response signal in response to the multicast transmission to indicate whether the terminal device successfully received the multicast transmission, wherein
at least one of the receiving data and the transmitting the response signal is performed via a narrow-band carrier having a bandwidth less than a bandwidth of a conventional carrier carrying the narrow-band carrier,
the narrow-band carrier is a continuous band within the conventional carrier, and
the narrow-band carrier is treatable as logically distinct from data transmitted in parts of the conventional carrier other than in the narrow-band carrier, such that data transmitted on the narrow-band carrier is decodable without decoding all control data of the conventional carrier.

* * * * *